US009401746B2

(12) United States Patent
Sugiyama

(10) Patent No.: US 9,401,746 B2
(45) Date of Patent: Jul. 26, 2016

(54) SIGNAL PROCESSING APPARATUS, SIGNAL PROCESSING METHOD, AND SIGNAL PROCESSING PROGRAM

(71) Applicant: NEC Corporation, Minato-ku, Tokyo (JP)

(72) Inventor: Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/647,200

(22) PCT Filed: Nov. 1, 2013

(86) PCT No.: PCT/JP2013/079702
§ 371 (c)(1),
(2) Date: May 26, 2015

(87) PCT Pub. No.: WO2014/084000
PCT Pub. Date: Jun. 5, 2014

(65) Prior Publication Data
US 2015/0318902 A1 Nov. 5, 2015

(30) Foreign Application Priority Data
Nov. 27, 2012 (JP) ................................. 2012-259219

(51) Int. Cl.
*H04B 1/709* (2011.01)
*H04B 7/01* (2006.01)
(Continued)

(52) U.S. Cl.
CPC .............. *H04B 7/01* (2013.01); *G10L 21/0232* (2013.01); *H04B 1/709* (2013.01); *H04B 1/7115* (2013.01)

(58) Field of Classification Search
CPC ............ G10L 21/0208; G10L 21/0232; H04B 1/1027; H04B 15/00; H04B 1/04; H04B 1/1036; H04B 1/123; H04B 1/1661; H04B 7/01; H04B 1/709; H04B 1/7115; G01R 23/16; H04L 27/265
See application file for complete search history.

(56) References Cited

U.S. PATENT DOCUMENTS

| 6,526,378 B1* | 2/2003 | Tasaki ................. G10L 21/0208 704/205 |
| 2013/0216058 A1* | 8/2013 | Furuta .................... H04R 3/002 381/71.1 |

FOREIGN PATENT DOCUMENTS

| JP | 10-149198 A | 6/1998 |
| JP | 2002-023800 A | 1/2002 |

(Continued)

OTHER PUBLICATIONS

Akihiko Sugiyama, "Single-Channel Impact-Noise Suppression with No Auxiliary Information for Its Detection," Proc. IEEE Workshop on Appl. of Sig. Proc. to Audio and Acoustics(WASPAA), pp. 127-130, Oct. 2007.

(Continued)

*Primary Examiner* — Vineeta Panwalkar

(57) ABSTRACT

To obtain a high-quality enhanced signal, there is provided an apparatus including a transformer that transforms a mixed signal, in which a first signal and a second signal coexist, into a phase component for each frequency and one of an amplitude component and a power component for each frequency, an amplitude analyzer that derives a predetermined frequency at which one of the amplitude component and the power component matches a predetermined condition, a change amount generator that generates a change amount of the phase component at the predetermined frequency by using a series of data with a cross-correlation weaker than that of the phase components, a phase controller that controls the phase component at the predetermined frequency by using the change amount provided from the change amount generator, and an inverse transformer that generates an enhanced signal by using the phase component having undergone control processing by the phase controller.

9 Claims, 25 Drawing Sheets

(51) Int. Cl.
*H04B 1/7115* (2011.01)
*G10L 21/0232* (2013.01)

(56) References Cited

FOREIGN PATENT DOCUMENTS

| JP | 2004-272292 A | 9/2004 |
|---|---|---|
| WO | 2007/029536 A1 | 3/2007 |
| WO | 2012/070671 A1 | 5/2012 |
| WO | 2012/114628 A1 | 8/2012 |

OTHER PUBLICATIONS

ISO/IEC 11172-3: 1993, Information technology—Coding of moving pictures and associated audio for digital storage media at up to about 1.5 Mbit/s—Part 3: Audio, Aug. 1993.

R.L. Bouquin-Jeannes and G. Faucon, "Proposal of a voice activity detector for noise reduction," Electron Letters, vol. 30, No. 12, pp. 930-932, Dec. 1994.

J. Ramirez, J.C. Segura, C. Benitez, L. Garcia, A. Rubio, "Statistical voice activity detection using a multiple observation likelihood ratio test," IEEE Signal Processing Letters, vol. 12, No. 10, pp. 689-692, Oct. 2005.

M. Kato, A. Sugiyama, and M. Serizawa, "Noise suppression with high speech quality based on weighted noise estimation and MMSE STSA," IEICE Trans. Fundamentals (Japanese Edition), vol. J87-A, No. 7, pp. 851-860, Jul. 2004.

R. Martin, "Spectral subtraction based on minimum statistics," EUSPICO-94, pp. 1182-1185, Sep. 1994.

B. Rad and T. Virtanen, "Phase spectrum prediction of audio signals," Proc. ISCCSP2012, CD-ROM, May 2012.

S. T. Kaplan and T. J. Ulrych, "Phase Unwrapping: A review of methods and a novel technique," Proc. 2007 CSPG CSEG Conv. pp. 534-537, May 2007.

International Search Report for PCT Application No. PCT/JP2013/079702, mailed on Feb. 4, 2014.

\* cited by examiner

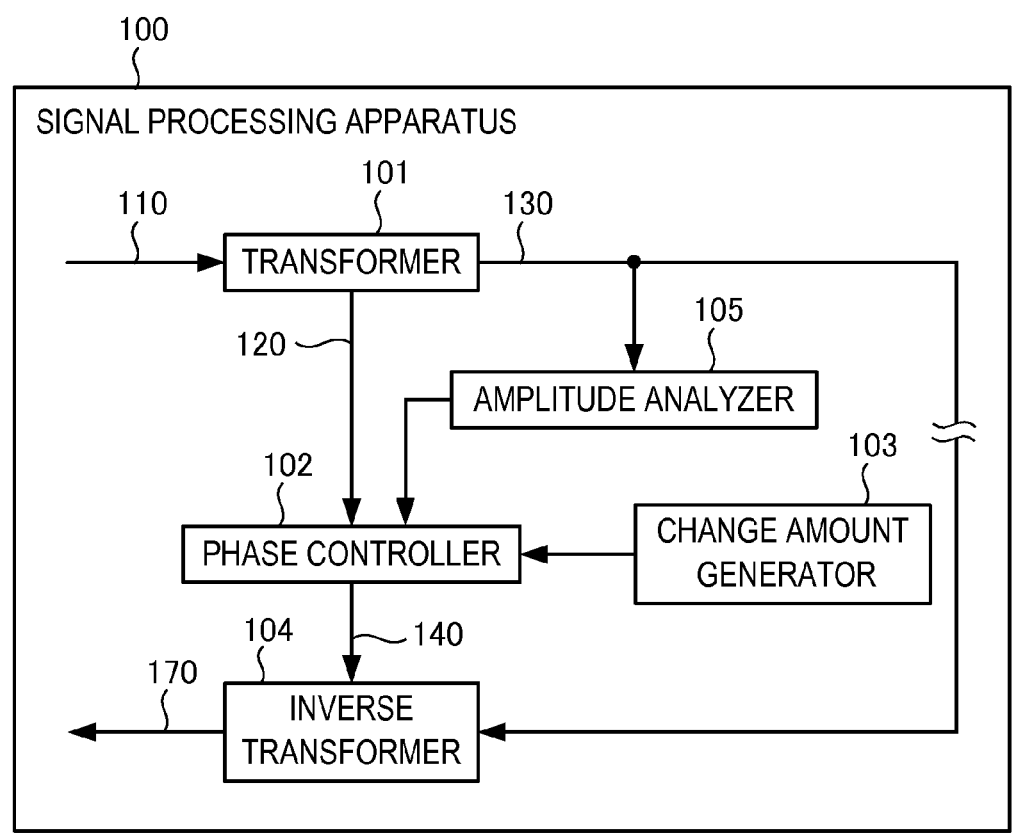
F I G. 1

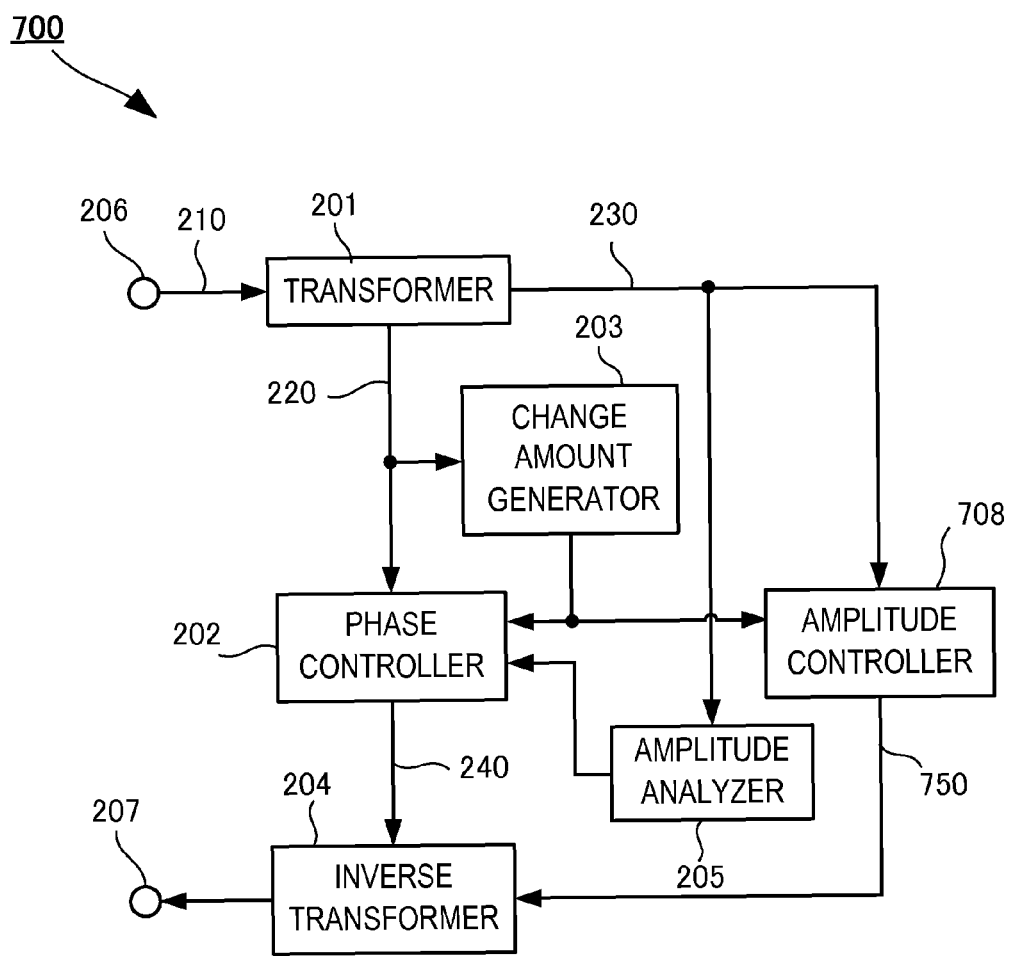
F I G. 7

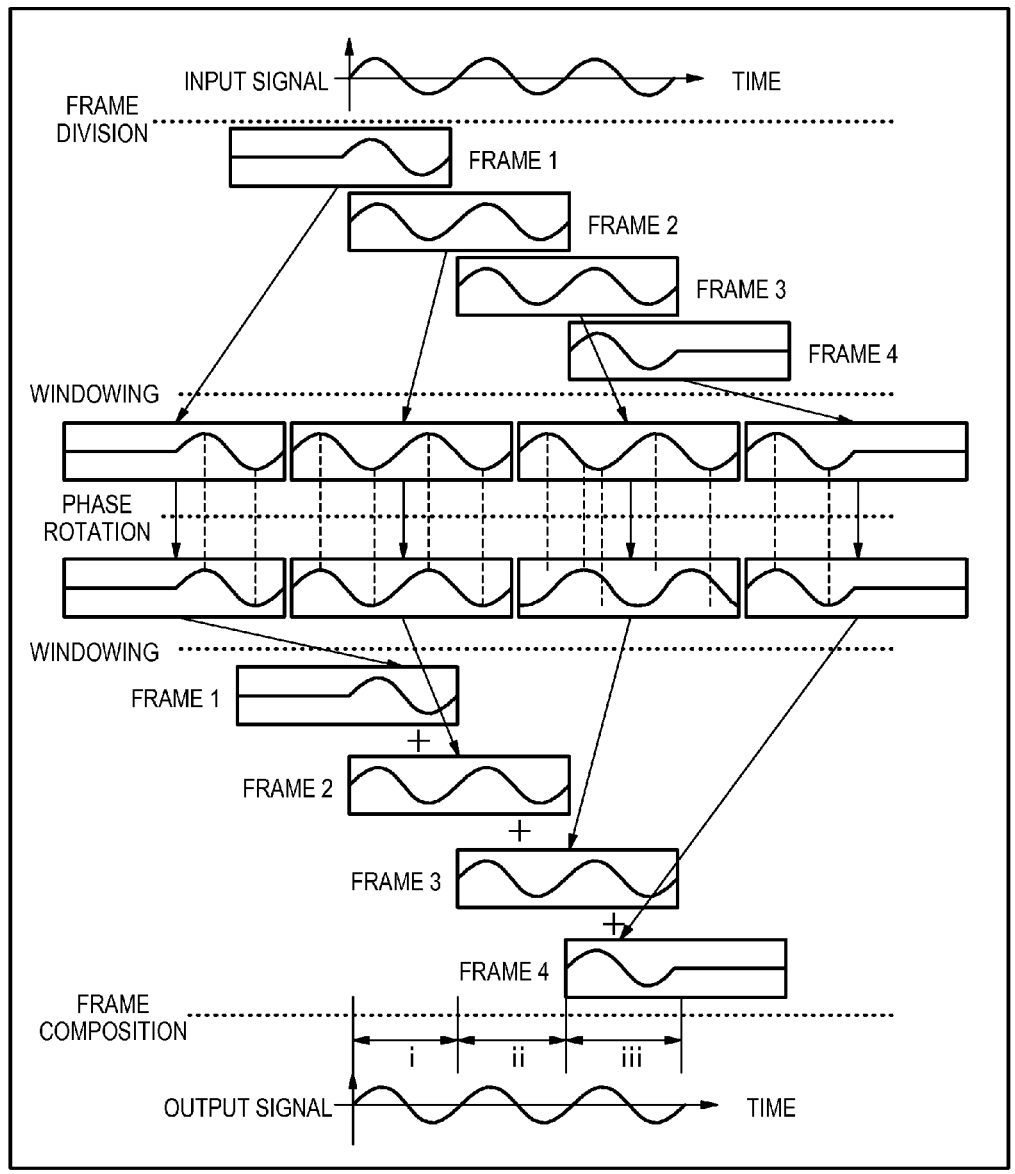
F I G. 9

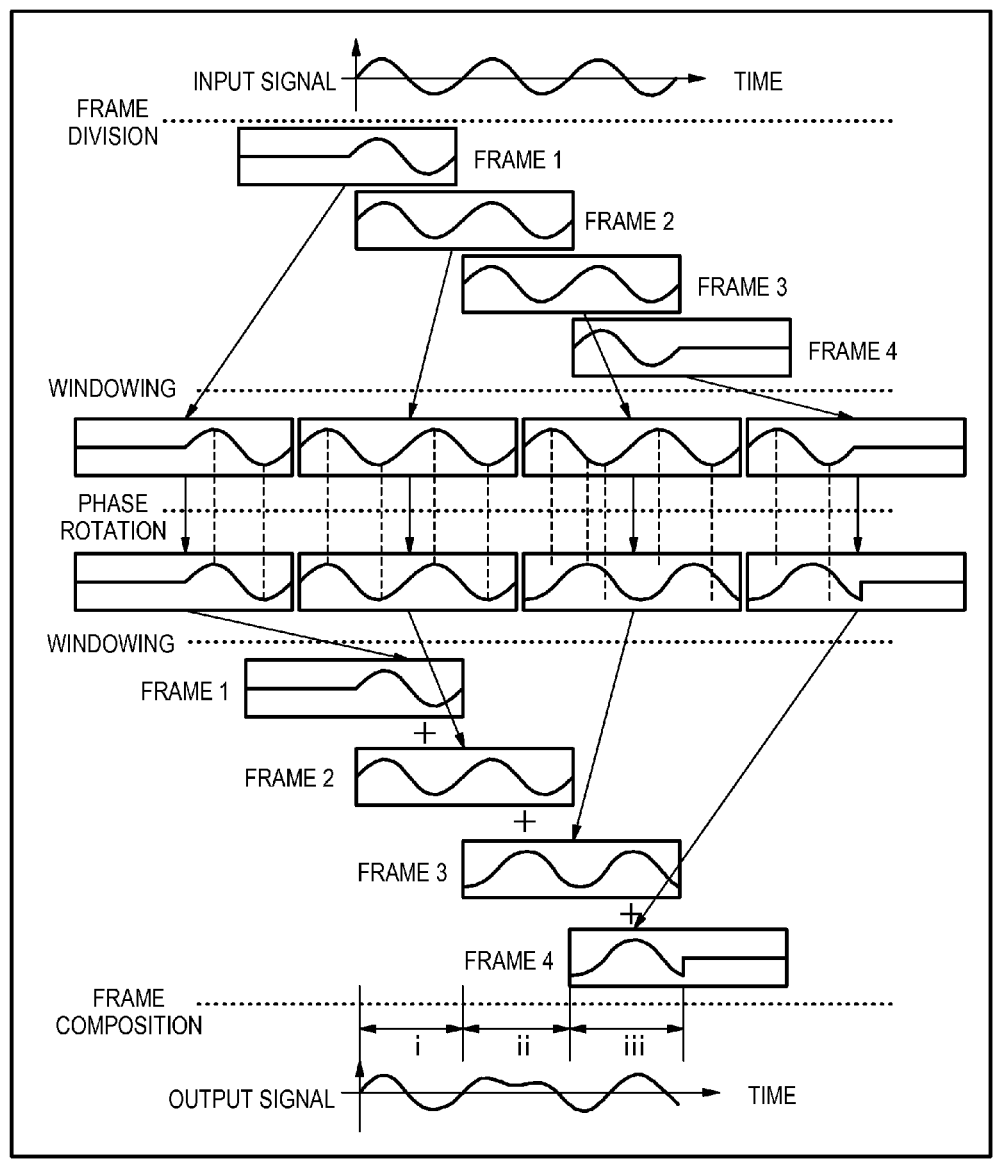
F I G. 10

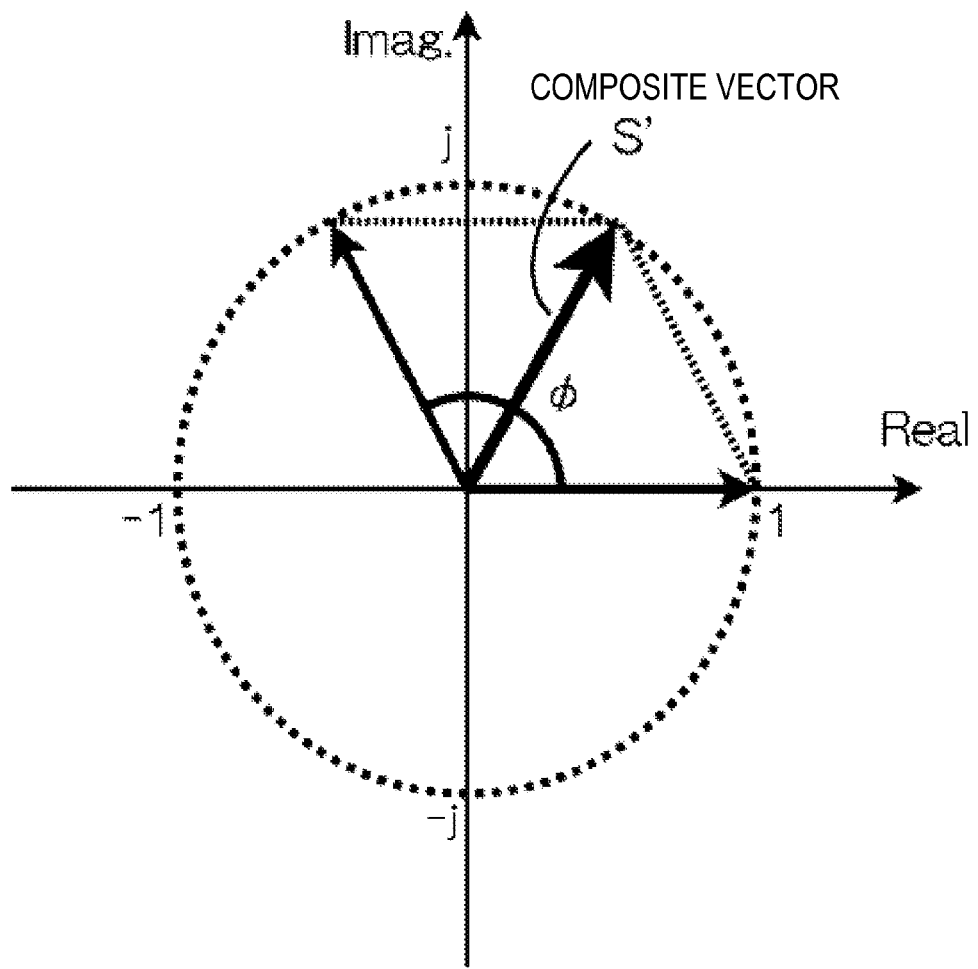
F I G. 13

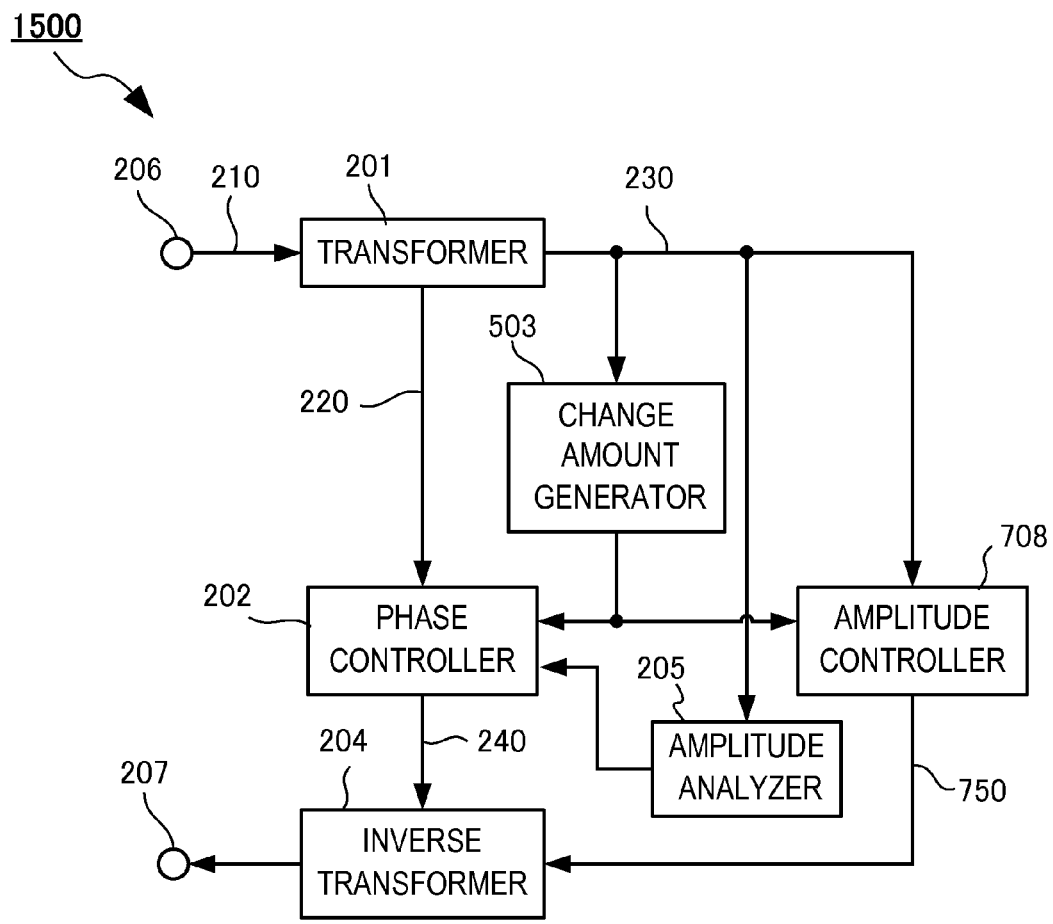
F I G. 15

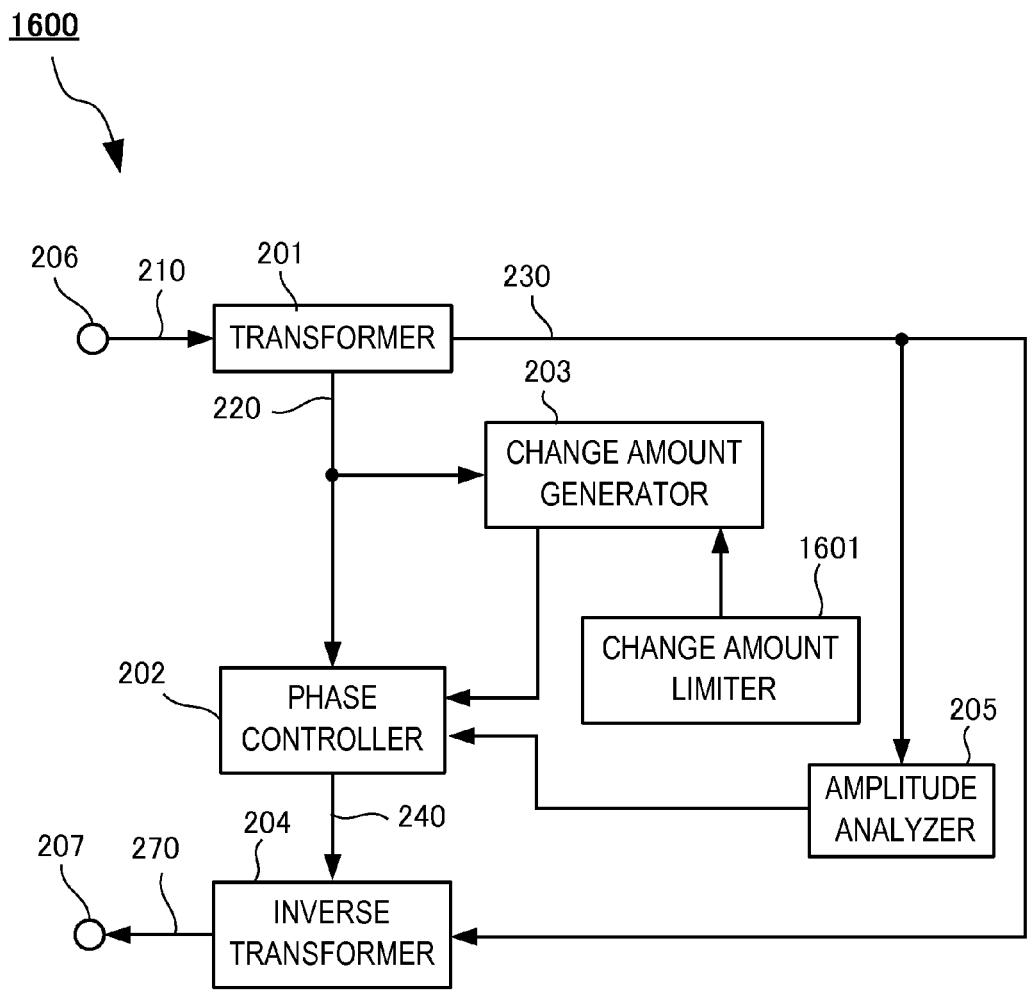
F I G. 16

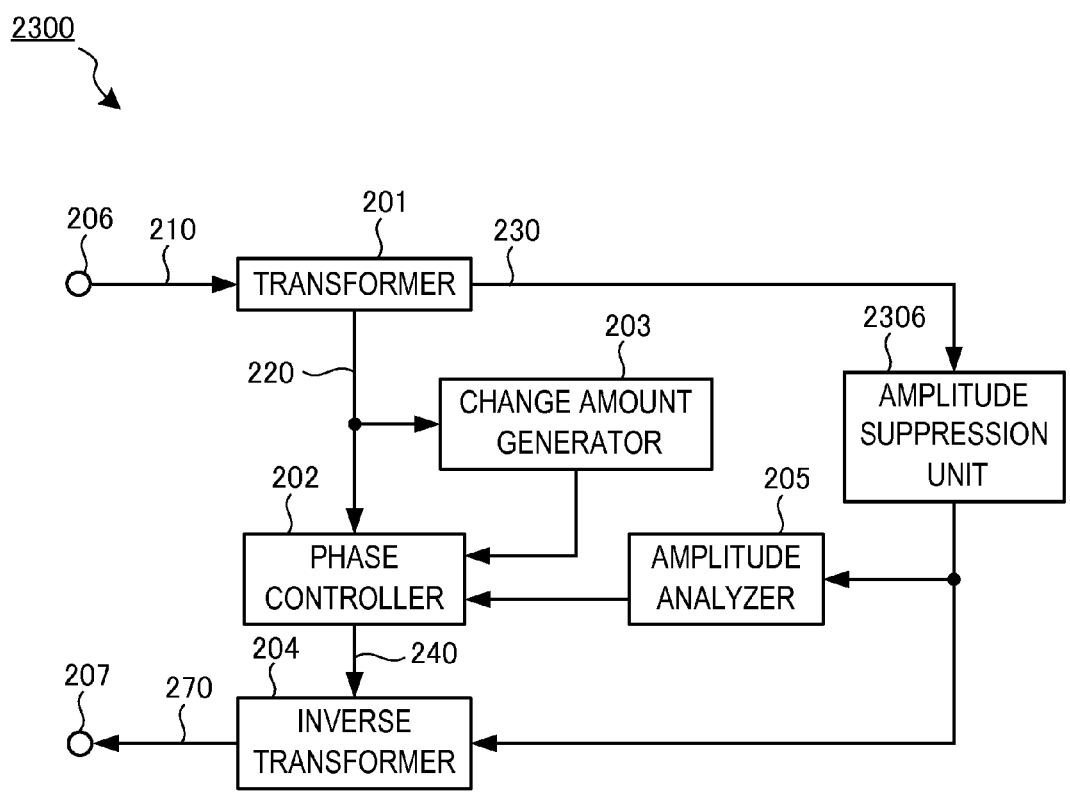
F I G. 23

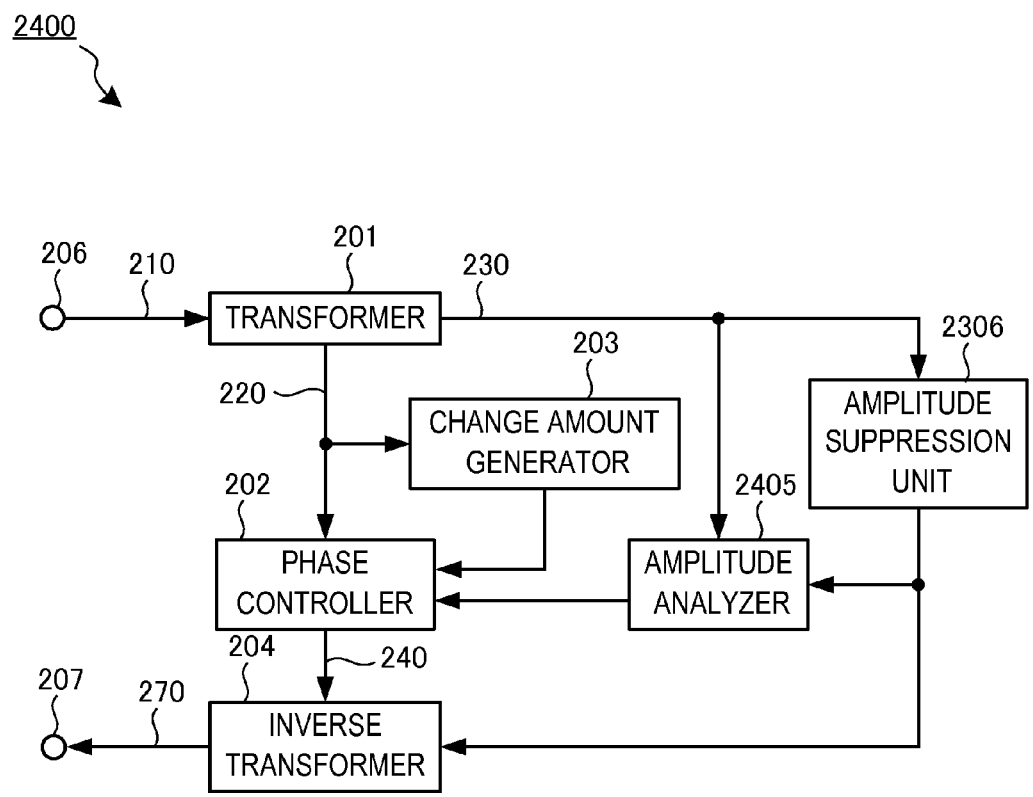
F I G. 24

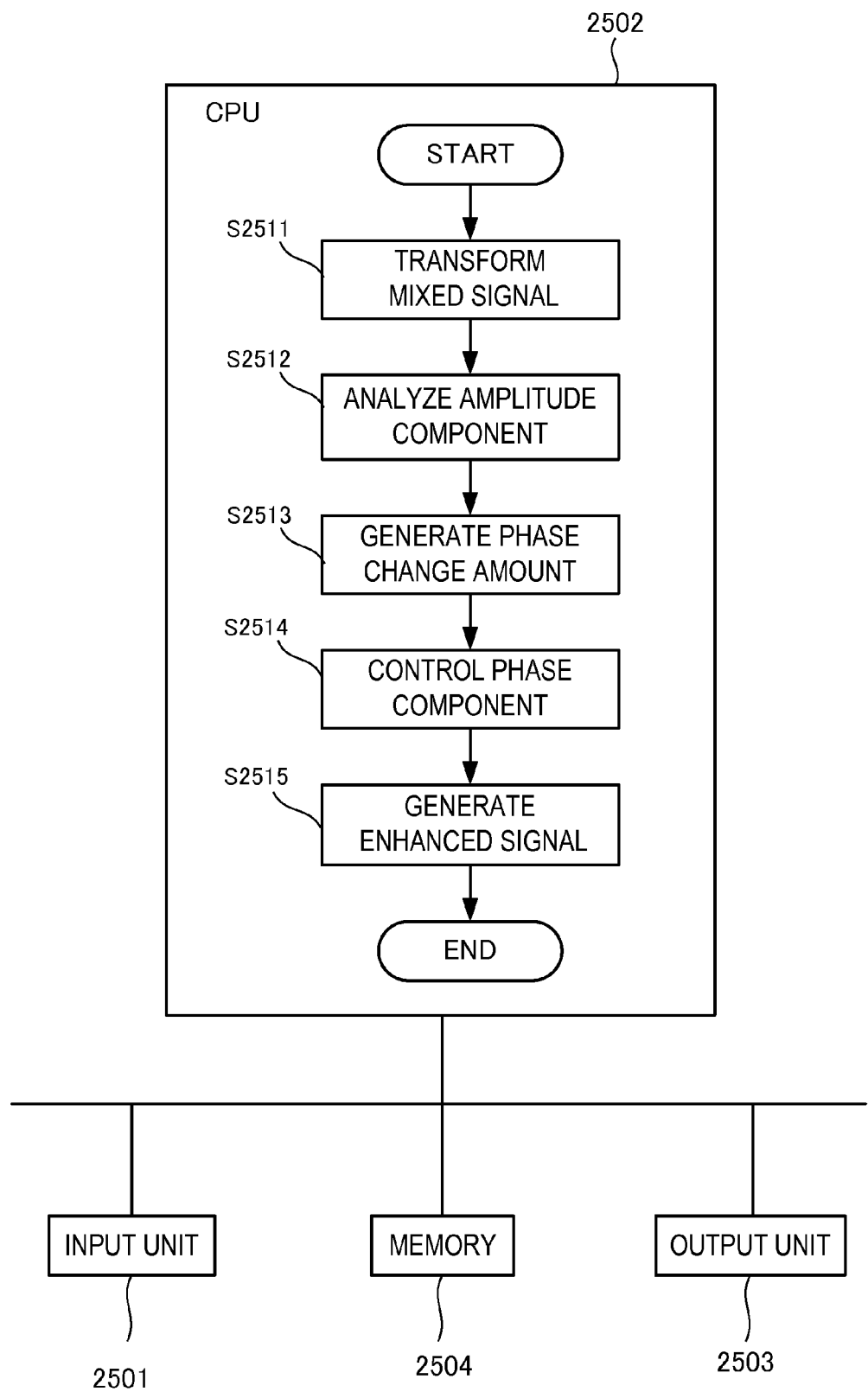
F I G. 25

SIGNAL PROCESSING APPARATUS, SIGNAL PROCESSING METHOD, AND SIGNAL PROCESSING PROGRAM

This application is a National Stage Entry of PCT/JP2013/079702 filed on Nov. 1, 2013, which claim priority from Japanese Patent Application 2012-259219 filed Nov. 27, 2012, the content of all of which are incorporated herein by reference, in their entirety.

TECHNICAL FIELD

The present invention relates to a signal processing technique of controlling the phase component of a signal.

BACKGROUND ART

As examples of a technique of performing signal processing by controlling the phase component of a signal, patent literature 1 and non-patent literature 1 disclose noise suppression techniques which pay attention to a phase spectrum. In the techniques described in patent literature 1 and non-patent literature 1, an amplitude spectrum pertaining to noise is suppressed, and at the same time, the phase spectrum is shifted by a random value of up to $\pi/4$. The techniques described in patent literature 1 and non-patent literature 1 implement, by shifting the phase spectrum at random, suppression of noise which cannot be suppressed by only attenuation of the noise spectrum.

CITATION LIST

Patent Literature

Patent literature 1: International Publication No. 2007/029536
Non-patent literature 1: Akihiko Sugiyama, "Single-Channel Impact-Noise Suppression with No Auxiliary Information for Its Detection," Proc. IEEE Workshop on Appl. of Sig. Proc. to Audio and Acoustics (WASPAA), pp. 127-130, October 2007.

SUMMARY OF THE INVENTION

Technical Problem

However, as in patent literature 1 and non-patent literature 1, shifting phase spectra at all frequencies at random causes a defect in calculation amount or signal quality.
The present invention enable to provide a signal processing technique of solving the above-described problem.

Solution to Problem

One aspect of the present invention provides an apparatus characterized by comprising:
a transformer that transforms a mixed signal, in which a first signal and a second signal coexist, into a phase component for each frequency and one of an amplitude component and a power component for each frequency;
an amplitude analyzer that derives a predetermined frequency at which one of the amplitude component and the power component matches a predetermined condition;
a change amount generator that generates a change amount of the phase component at the predetermined frequency by using a series of data with a cross-correlation weaker than that of the phase components;
a phase controller that controls the phase component at the predetermined frequency by using the change amount provided from said change amount generator; and
an inverse transformer that generates an enhanced signal by using the phase component having undergone control processing by said phase controller.

Another aspect of the present invention provides a method characterized by comprising:
transforming a mixed signal, in which a first signal and a second signal coexist, into a phase component for each frequency and one of an amplitude component and a power component for each frequency;
deriving a predetermined frequency at which one of the amplitude component and the power component matches a predetermined condition;
generating a change amount of the phase component at the predetermined frequency by using a series of data with a cross-correlation weaker than that of the phase components;
controlling the phase component at the predetermined frequency by using the change amount provided in the generating the change amount; and
generating an enhanced signal by using the phase component having undergone control processing in the controlling.

Still other aspect of the present invention provides a program for causing a computer to execute a method, characterized by comprising:
transforming a mixed signal, in which a first signal and a second signal coexist, into a phase component for each frequency and one of an amplitude component and a power component for each frequency;
deriving a predetermined frequency at which one of the amplitude component and the power component matches a predetermined condition;
generating a change amount of the phase component at the predetermined frequency by using a series of data with a cross-correlation weaker than that of the phase components;
controlling the phase component at the predetermined frequency by using the change amount provided in the generating the change amount; and
generating an enhanced signal by using the phase component having undergone control processing in the controlling.

Advantageous Effects of Invention

According to the present invention, it is possible to provide a signal processing technique of effectively controlling the phase components of an input signal at some frequencies.

BRIEF DESCRIPTION OF DRAWINGS

FIG. 1 is a block diagram showing the schematic arrangement of a signal processing apparatus according to the first embodiment of the present invention.

FIG. 7 is a block diagram showing the schematic arrangement of a noise suppression apparatus according to the fourth embodiment of the present invention;

FIG. 9 is a view showing a signal flow when no phase rotation is performed in the frequency domain according to the fourth embodiment of the present invention;

FIG. 10 is a view showing a signal flow when phase rotation is performed in the frequency domain according to the fourth embodiment of the present invention;

FIG. 13 is a view showing the vector of a frequency domain signal when phase rotation is performed in the frequency domain according to the fourth embodiment of the present invention;

FIG. 15 is a block diagram showing the arrangement of a noise suppression apparatus according to the fifth embodiment of the present invention;

FIG. 16 is a block diagram showing the arrangement of a noise suppression apparatus according to the sixth embodiment of the present invention;

FIG. 23 is a block diagram showing the schematic arrangement of a noise suppression apparatus according to the 12th embodiment of the present invention;

FIG. 24 is a block diagram showing the schematic arrangement of a noise suppression apparatus according to the 13th embodiment of the present invention; and FIG. 25 is a block diagram showing the schematic arrangement of a noise suppression apparatus according to another embodiment of the present invention.

DESCRIPTION OF THE EMBODIMENTS

Figure 2:
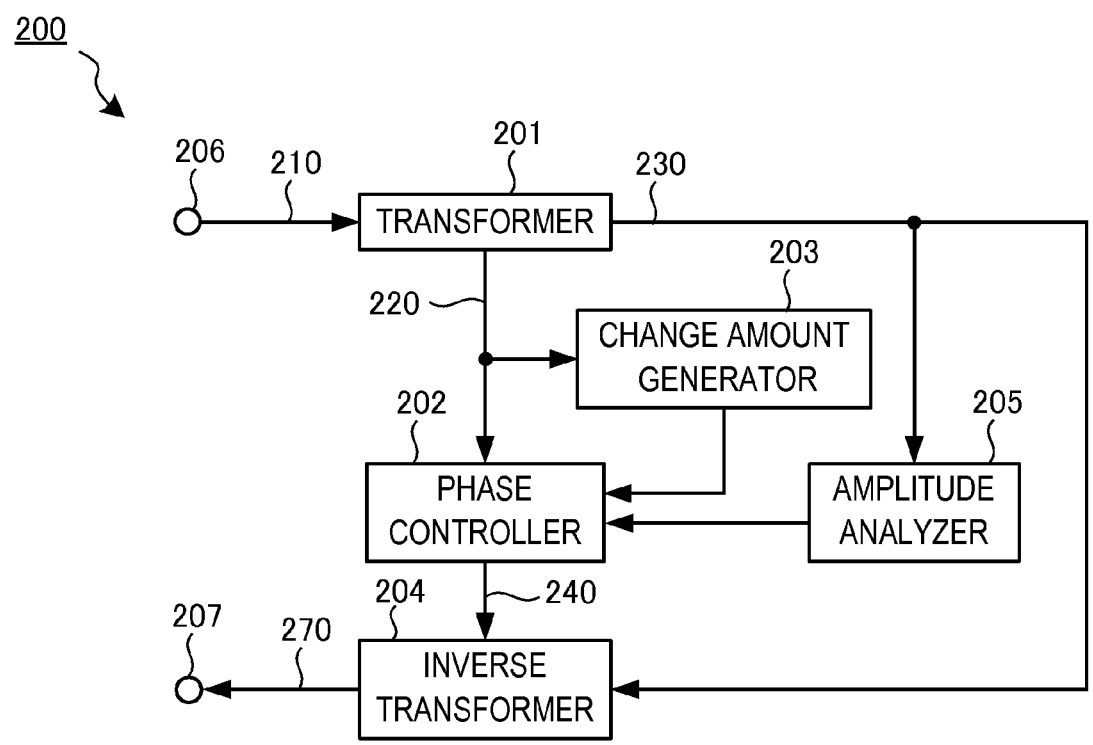
FIG. 2 is a block diagram showing the schematic arrangement of a noise suppression apparatus according to the second embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

FIG. 1 is a block diagram showing the schematic arrangement of a signal processing apparatus 100 according to the first embodiment of the present invention. Referring to FIG. 1, the signal processing apparatus 100 includes a transformer 101, a phase controller 102, a change amount generator 103, an inverse transformer 104, and an amplitude analyzer 105.

The transformer 101 transforms a mixed signal 110, in which the first and second signals coexist, into a phase component 120 for each frequency and an amplitude component or power component 130 for each frequency.

The amplitude analyzer 105 derives a predetermined frequency at which an amplitude component or power component matches a predetermined condition. The change amount generator 103 generates a change amount of a phase component at the predetermined frequency by using a series of data with a cross-correlation weaker than that of the phase components 120. The phase controller 102 controls to reduce the correlation of the phase component 120 at the predetermined frequency by using the change amount provided from the change amount generator 103. The inverse transformer 104 generates an enhanced signal 170 using a phase component 140 having undergone control processing by the phase controller 102.

With the above arrangement, it is possible to more effectively select a frequency at which phase control is to be performed, and control the phase component 120, thereby effectively implementing suppression of noise which cannot be suppressed by only attenuation of the amplitude spectrum.

(Second Embodiment)

<<Overall Arrangement>>

A noise suppression apparatus 200 according to the second embodiment of the present invention will be described with reference to FIGS. 2 to 4. FIG. 2 is a block diagram showing the overall arrangement of the noise suppression apparatus 200. The noise suppression apparatus 200 according to this embodiment functions as part of an apparatus such as a digital camera, notebook personal computer, or mobile phone. However, the present invention is not limited to this. The noise suppression apparatus 200 is applicable to all information processing apparatuses requested to remove noise from an input signal. When, for example, an operation such as pressing of a button is performed near a microphone, the noise suppression apparatus according to this embodiment appropriately removes an impulsive sound generated by the operation of the button. In brief, an impulsive sound is appropriately removed by transforming a signal including the impulsive sound into a frequency domain signal, and controlling the phase component in the frequency domain using a series of data with a weak cross-correlation.

A deteriorated signal (a signal in which a desired signal and noise coexist) is supplied as a series of sample values to an input terminal 206. When a deteriorated signal is supplied to the input terminal 206, a transformer 201 performs transform such as Fourier transform for the supplied deteriorated signal, and divides the resultant signal into a plurality of frequency components. The transformer 201 independently processes the plurality of frequency components for each frequency. The following description pays attention to a specific frequency component. The transformer 201 supplies an amplitude spectrum (amplitude component) 230 of the plurality of frequency components to an amplitude analyzer 205 and an inverse transformer 204. The transformer 201 supplies a phase spectrum (phase component) 220 of the plurality of frequency components to a phase controller 202 and a change amount generator 203. Note that although the transformer 201 supplies the deteriorated signal amplitude spectrum 230 to the amplitude analyzer 205 and the inverse transformer 204, the present invention is not limited to this. The transformer 201 may supply a power spectrum corresponding to the square of the deteriorated signal amplitude spectrum 230 to the amplitude analyzer 205 and the inverse transformer 204.

The change amount generator 203 generates a phase change amount by using the deteriorated signal phase spectrum 220 received from the transformer 201, and supplies the change amount to the phase controller 202. The "change amount" of the phase is a concept including the "rotation amount" and "replacement amount" of the phase, and indicates the control amount of the phase. The amplitude analyzer 205 analyzes the amplitude components to obtain a frequency at which the phase is to be controlled, and supplies the frequency to the phase controller 202. The phase controller 202 reduces the phase correlation by changing the deteriorated signal phase spectrum 220 supplied from the transformer 201 at the frequency designated by the amplitude analyzer 205 by using the change amount supplied from the change amount generator 203, and supplies the resultant data as an enhanced signal phase spectrum 240 to the inverse transformer 204. The inverse transformer 204 performs inverse transform by composing the enhanced signal phase spectrum 240 supplied from the phase controller 202 and the deteriorated signal amplitude spectrum 230 supplied from the transformer 201, and supplies the result of inverse transform as an enhanced signal 270 to an output terminal 207.

<<Arrangement of Transformer>>

Figure 3:
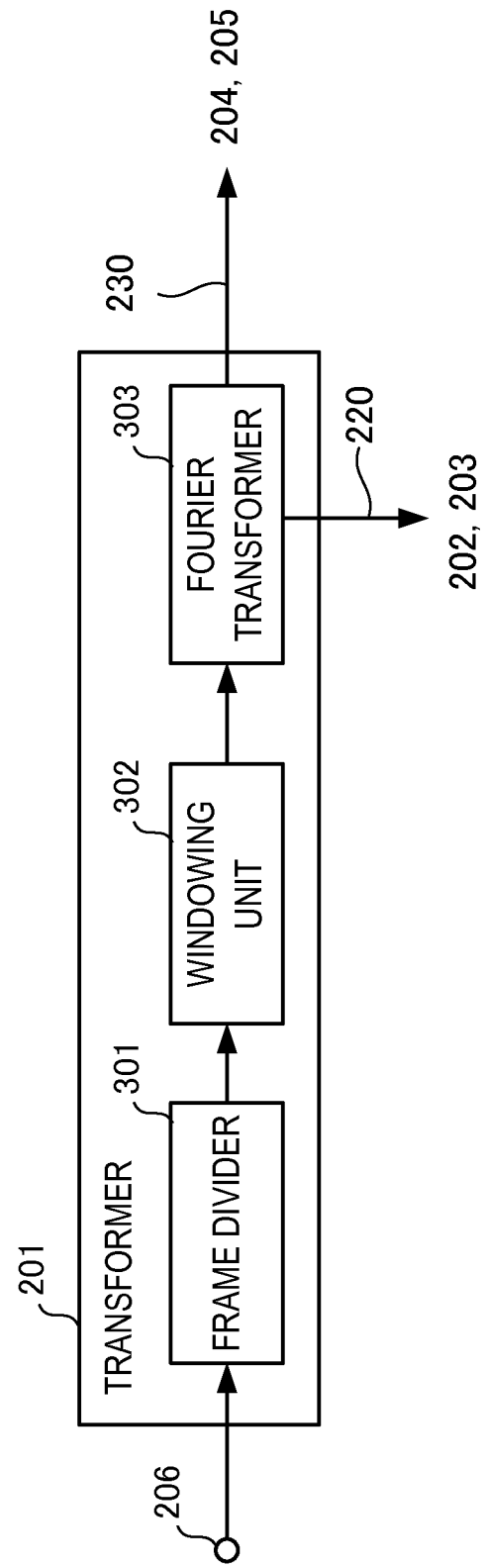
FIG. 3 is a block diagram showing the arrangement of a transformer included in the second embodiment of the present invention.

FIG. 3 is a block diagram showing the arrangement of the transformer 201. As shown in FIG. 3, the transformer 201 includes a frame divider 301, a windowing unit 302, and a Fourier transformer 303. A deteriorated signal sample is supplied to the frame divider 301, and divided into frames for every K/2 samples where K is an even number. The deteriorated signal sample divided into frames is supplied to the windowing unit 302, and multiplied by a window function w(t). A signal obtained by performing windowing for an input signal $y_n(t)$ (t=0, 1, ..., K/2−1) of the nth frame by w(t) is given by:

$$\bar{y}_n(t) = w(t) y_n(t) \quad (1)$$

The windowing unit 302 may partially superimpose (overlap) and window two successive frames. Assuming that the overlapping length is 50% of the frame length, the windowing unit 302 outputs the left-hand side of equation (2) below obtained for t=0, 1, ..., K/2−1.

$$\begin{aligned}\bar{y}_n(t) &= w(t) y_{n-1}(t + K/2) \\ \bar{y}_n(t + K/2) &= w(t + K/2) y_n(t)\end{aligned} \quad (2)$$

For a real signal, the windowing unit 302 may use a symmetric window function. The window function is designed so that, when the phase controller 202 performs no control operation, the input signal of the transformer 201 and the output signal of the inverse transformer 204 coincide with each other by excluding a calculation error. This means w(t)+w(t+K/2)=1.

The following description will continue by exemplifying a case in which two successive frames are made to overlap each other by 50% and windowed. For example, the windowing unit 302 may use, as w(t), a Hanning window given by:

$$w(t) = \begin{cases} 0.5 + 0.5 \cos\left(\dfrac{\pi(t - K/2)}{K/2}\right), & 0 \le t < K \\ 0, & \text{otherwise} \end{cases} \quad (3)$$

In addition, various window functions such as a Hamming window and triangle window are known. The windowed output is supplied to the Fourier transformer 303, and transformed into a deteriorated signal spectrum $Y_n(k)$. The deteriorated signal spectrum $Y_n(k)$ is separated into a phase and amplitude. A deteriorated signal phase spectrum arg $Y_n(k)$ is supplied to the phase controller 202 and change amount generator 203, and a deteriorated signal amplitude spectrum $|Y_n(k)|$ is supplied to the inverse transformer 204. As described above, the power spectrum may be used instead of the amplitude spectrum.

<<Arrangement of Inverse Transformer>>

Figure 4:
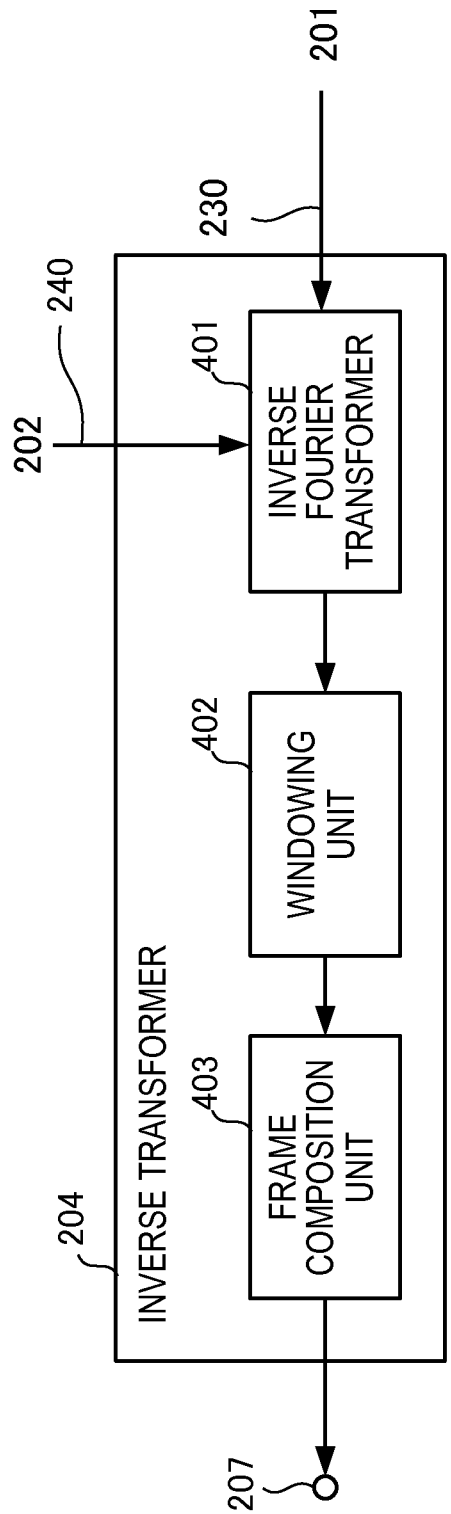
FIG. 4 is a block diagram showing the arrangement of an inverse transformer included in the second embodiment of the present invention.

FIG. 4 is a block diagram showing the arrangement of the inverse transformer 204. As shown in FIG. 4, the inverse transformer 204 includes an inverse Fourier transformer 401, a windowing unit 402, and a frame composition unit 403. The inverse Fourier transformer 401 obtains an enhanced signal (the left-hand side of equation (4) below) by multiplying the deteriorated signal amplitude spectrum 230 ($|X_n(k)|$) supplied from the transformer 201 and the enhanced signal phase spectrum 240 (arg $X_n(k)$) supplied from the phase controller 202.

$$X_n(k) = |X_n(k)| \cdot \arg X_n(k) \quad (4)$$

The inverse Fourier transformer 401 performs inverse Fourier transform for the obtained enhanced signal. The enhanced signal having undergone inverse Fourier transform is supplied to the windowing unit 402 as a series $x_n(t)$ (t=0, 1, ..., K−1) of time domain sample values in which one frame includes K samples, and multiplied by the window function w(t). A signal obtained by performing windowing for the input signal $x_n(t)$ (t=0, 1, ..., K/2−1) of the nth frame by w(t) is given by the left-hand side of:

$$\bar{x}_n(t) = w(t) x_n(t) \quad (5)$$

The windowing unit 402 may partially superimpose (overlap) and window two successive frames. Assuming that the overlapping length is 50% of the frame length, the windowing unit 402 outputs and transmits, to the frame composition unit 403, the left-hand side of the following equation for t=0, 1, ..., K/2−1.

$$\begin{aligned}\bar{x}_n(t) &= w(t) x_{n-1}(t + K/2) \\ \bar{x}_n(t + K/2) &= w(t + K/2) x_n(t)\end{aligned} \quad (6)$$

The frame composition unit 403 extracts outputs of two adjacent frames from the windowing unit 402 for every K/2 samples, superimposes them, and obtains an output signal (the left-hand side of equation (7) below) for t=0, 1, ..., K−1.

$$\hat{x}_n(t) = \bar{x}_{n-1}(t + K/2) + \bar{x}_n(t) \quad (7)$$

The frame composition unit 403 transmits the obtained output signal to the output terminal 207.

In FIGS. 3 and 4, the transform processes in the transformer 201 and inverse transformer 204 have been described as Fourier transform processes. However, another transform such as Hadamard transform, Haar transform, or Wavelet transform may be used, instead of Fourier transform. When the transformer 201 and inverse transformer 204 use Haar transform, the need for multiplication is eliminated, and it is thus possible to decrease the area on an LSI circuit. When the transformer 201 and inverse transformer 204 use Wavelet transform, it is possible to change the time resolution depending on the frequency, and thus an improvement in noise suppression effect can be expected.

After a plurality of frequency components obtained by the transformer 201 are integrated, the change amount generator 203 may generate a change amount, the phase controller 202 may control the phase, and the amplitude analyzer 205 may analyze the amplitude. At this time, it is possible to obtain higher sound quality by integrating a larger number of frequency components from a low-frequency domain where the discrimination ability of auditory properties is high toward a high-frequency domain where the discrimination ability is poor so that the bandwidth after integration becomes wide. When phase control is executed after integrating a plurality of frequency components, the number of frequency components to which phase control is applied decreases, and the total amount of calculation can be reduced.

<<Operation of Amplitude Analyzer 205>>

The amplitude analyzer 205 receives the deteriorated signal amplitude spectrum 230 supplied from the transformer 201, and analyzes amplitude information to decide a frequency at which the phase correlation is to be reduced. The purpose of phase control by the phase controller 202 is to remove features unique to a signal input to the transformer 201. Even if such features remain, no problem arises for a signal of an unperceivable amplitude when the inverse transformer 204 performs inverse transform by integrating a phase and amplitude. Therefore, the amplitude analyzer 205 derives a predetermined frequency at which an amplitude component or power component matches a predetermined condition, and performs phase control at the predetermined frequency. For example, the amplitude analyzer 205 can decide, as a frequency at which phase control is to be performed, a frequency at which an amplitude component is larger than the predetermined first threshold. By deciding, as a frequency at which phase control is to be performed, a frequency having an amplitude larger than the predetermined first threshold, it is possible to exclude the frequency of the unperceivable amplitude, thereby reducing the calculation amount necessary for phase control. Alternatively, by deciding, as a frequency at which phase control is to be performed, a frequency having an amplitude smaller than the predetermined second threshold, it is possible to avoid reducing the phase correlation for a target signal component such as a sound, thereby preventing degradation in quality of the target signal component. There are provided the following methods of defining a phase control target frequency using the first threshold and/or the second threshold.

[Method 1: Setting of Absolute Audibility Threshold as First Threshold]

An absolute audibility threshold is the lowest human perception level below which perception is impossible. By setting the absolute audibility threshold as the first threshold, therefore, it is possible to prevent control processing from being applied to a phase at a frequency of an unperceivable level, resulting in a decrease in calculation amount.

[Method 2: Setting of Masking Level as First Threshold]

A masking level is obtained by correcting the absolute audibility threshold in consideration of the masking effect of a signal component with a large amplitude, which is called a masker, and reflects a phenomenon in which a small amplitude component at a frequency near that of a large amplitude component is unperceivable. A method of calculating a masking level is described in detail in ISO/IEC 11172-3: 1993, Information technology—Coding of moving pictures and associated audio for digital storage media at up to about 1.5 Mbit/s—Part 3: Audio, August 1993 (non-patent literature 2). By setting the masking level as the first threshold, even if there exists a small amplitude component at frequency near that of a large amplitude component, it is possible to prevent control processing from being applied to a phase at a frequency of an unperceivable level, resulting in a decrease in calculation amount.

[Method 3: Setting of Both First Threshold and Second Threshold]

If all frequencies having large amplitudes are selected, a target signal component such as a sound may be included, thereby causing a problem. This is because the target signal component generally has an amplitude larger than those of the remaining signal components in many cases. Therefore, it is desirable to exclude, from frequencies at which phase control is to be performed, a frequency of an amplitude which includes a target signal component at high probability. This can be implemented by introducing the second threshold larger than the first threshold, and deciding, as a frequency at which phase control is to be performed, a frequency having an amplitude larger than the first threshold and smaller than the second threshold. That is, a frequency having a medium amplitude which is not large or small is decided as a frequency at which phase control is to be performed. Applying processing using the second threshold avoids reducing the phase correlation with respect to a target signal component such as a sound, thereby preventing degradation in quality of the target signal component.

[Method 4: Setting of First and Second Thresholds not to Include Frequency at which Amplitude Reaches Peak as Phase Control Target Frequency]

A target signal component can be excluded by using the peak of a spectrum contained in an amplitude component. For example, it is known that a signal such as a sound or music contains a plurality of clear peaks. The quality of the peak components exerts an extremely large influence on the subjective sound quality. It is thus effective to set not to set the frequencies of the peak components of the amplitude component as frequencies at which phase control is to be performed. There are known various methods of detecting a frequency at which an amplitude component reaches its peak. For example, a method disclosed in non-patent literature 2 described above can be used. By excluding a frequency at which the peak is detected from frequencies at which phase control is to be performed, it is possible to avoid a decrease in phase correlation with respect to a target signal component such as a sound, thereby preventing degradation in quality of the target signal component.

In addition to the frequency detected as a peak component, frequencies close to it may be excluded from the phase control target frequencies. At this time, on the lower and higher sides of the peak frequency, different ranges within which frequencies are determined as close ones may be set. For example, frequency ranges $N_L$ and $N_H$ ($N_L < N_H$) on the lower and higher sides of each peak are excluded from the phase control target frequencies. This is based on a phenomenon in which masking has an influence on the human auditory properties in a wider range on the higher side of the peak. By excluding the frequency detected as a peak and the frequencies close to it from the phase control target frequencies, the phase correlation is not reduced with respect to a target signal component such as a sound, thereby preventing degradation in quality of the target signal component.

[Method 5: Setting of First and Second Thresholds not to Include Frequency Expressing Frictional Sound as Phase Control Target Frequency]

One of important components of sounds is a frictional sound. It is possible to exclude a frictional sound from the phase control target frequencies. The frictional sound is known to have a relatively flat amplitude distribution from a low frequency range to a high frequency range. This means that an amplitude in the high frequency range is relatively large. When an amplitude component in a high frequency range is larger than usual, a frictional sound is determined, and the high frequency range is excluded from phase control target frequencies. As a high frequency range, a specific frequency component may be used, or the sum of amplitudes of a plurality of continuous or discontinuous frequency components may be used. An amplitude component in a normal high frequency range can be obtained by averaging the values of amplitude components in a frame in which amplitude components are relatively small. By excluding the frequency of a frictional sound from phase control target frequencies, it is possible to prevent degradation in quality of the frictional sound.

To exclude a target signal component, it is possible to detect a target signal section, and set no frequencies at which phase control is to be performed (perform no phase control for all frequencies) during the section. Among a number of literatures associated with sound section detection when a target signal is a sound, for example, see R. L. Bouquin-Jeannes and G. Faucon, "Proposal of a voice activity detector for noise reduction," Electron Letters, Volume 30, No. 12, pp. 930-932, December 1994 (non-patent literature 3) or J. Ramirez, J. C. Segura, C. Benitez, L. Garcia, A. Rubio, "Statistical voice activity detection using a multiple observation likelihood ratio test," IEEE Signal Processing Letters, Volume 12, Number 10, pp. 689-692, October 2005 (non-patent literature 4).

[Method 6: Setting of Amplitude Slightly Smaller than Background Noise Level as First Threshold]

Although a frequency component suppressed close to the amplitude of background noise (environmental noise) is perceivable, a smaller amplitude is masked by the background noise itself, and is thus unperceivable. An amplitude slightly smaller than the background noise level can be set as the first threshold.

It is possible to estimate background noise by averaging the amplitudes of deteriorated signals. As an averaging method, it is possible to apply a method using a sliding window for a finite number of samples or a method using leaky integration. The former method is known as calculation for a finite impulse response filter in the field of signal processing, and the number of taps of the filter corresponds to the length of the sliding window. Letting L be the finite number of samples, the average value can be obtained by:

$$\bar{x}_k^2 = \frac{1}{L} \sum_{j=k-L-1}^{k} x_j^2 \qquad (8)$$

In leaky integration, linear leaky integration is used most widely.

$$\bar{x}_k^2 = \beta \cdot \bar{x}_{k-1}^2 + (1-\beta) \cdot x_h^2 \qquad (9)$$

where β is a constant satisfying 0<β.

It is also possible to estimate background noise only when the amplitude of a deteriorated signal is close to estimated background noise level (the amplitude is equal to or smaller than a predetermined multiple of the background noise level or the difference between the amplitude and the background noise level is equal to or smaller than a predetermined value). The initial value of the background noise estimation can be obtained as the average of the amplitudes of deteriorated signals. After obtaining the initial value, only deteriorated signals close to the estimated background noise value are used for an averaging operation.

In addition, various noise estimation methods can be used, as described in M. Kato, A. Sugiyama, and M. Serizawa, "Noise suppression with high speech quality based on weighted noise estimation and MMSE STSA," IEICE Trans. Fundamentals (Japanese Edition), vol. J87-A, no. 7, pp. 851-860, July 2004 (non-patent literature 5) and R. Martin, "Spectral subtraction based on minimum statistics," EUSPICO-94, pp. 1182-1185, September 1994 (non-patent literature 6).

By setting an amplitude slightly smaller than the background noise level as the first threshold, and setting an amplitude larger than the first threshold as a frequency at which phase control is to be performed, no phase control is performed for an unperceivable amplitude component, thereby reducing the calculation amount for phase control.

By methods 1 to 6 described above, it is possible to improve the quality of a target signal component in any environment.

<<Operation of Change Amount Generator>>

The change amount generator 203 is supplied with the deteriorated signal phase spectrum 220 from the transformer 201, and generates a change amount to reduce the phase correlation. Since the deteriorated signal phase spectrum 220 supplied from the transformer 201 is represented by arg $Y_n$(k) (0≤k<K), the change amount generator 203 can obtain an enhanced signal phase spectrum arg $X_{ii}$(k) for which correlation has been reduced, as given by:

$$\arg X_n(k) = (-1)^k \arg Y_n(k) \qquad (10)$$

This corresponds to alternately inverting the signs of the phases. Instead of alternately inverting the signs, inversion may be performed for every arbitrary integer smaller than K, as a matter of course.

The change amount generator 203 obtains a rotation amount Δarg $Y_n$(k) as a change amount necessary for phase control indicated by equation (10), as given by:

$$\Delta \arg Y_n(k) = \{(-1)^k - 1\} \arg Y_n(k) \qquad (11)$$

That is, the change amount generator 203 generates the rotation amount Δarg $Y_n$(k) indicated by equation (11) as a change amount. Also, it is possible to use:

$$\Delta \arg Y_n(k) = \arg Y_n(\text{mod}[k+K/2-1, K]) \qquad (12)$$

where mod[k, K] represents a remainder obtained by dividing k by K. The rotation amount Δarg $Y_n$(k) at this time corresponds to a phase obtained by shifting the original phase by K/2 samples. It is apparent that he shift amount is not limited to K/2, and may be an arbitrary integer.

Alternatively, a phase at a position symmetrical to the position of the original phase with respect to K/2 is set as the rotation amount Δarg $Y_n$(k). This uses:

$$\Delta \arg Y_n(k) = \arg Y_n(\text{mod}[K-k+1, K]) \qquad (13)$$

Furthermore, it is possible to generate a change amount by combining these two kinds of processes, that is, sign inversion and addition of the shifted phase. That is, $$\Delta \arg Y_n(k) = \{(-1)^k - 1\} \arg Y_n(\text{mod}[k+K/2-1, K]) \qquad (14)$$

or $$\Delta \arg Y_n(k) = \{(-1)^{mod(k+N/2-1,N)} - 1\} \arg Y_n(\text{mod}[k+K/2-1, K]) \qquad (15)$$

As for the shift addition, the shift amount K/2 can be changed. For example, if a frame number n at that time is set as the shift amount, the shift amount automatically changes with time. Similarly, in equations (14) and (15), equation (12) may be combined instead of equation (13).

Furthermore, constant multiplication can be combined with the selective sign inversion of the phase and shift addition processing. For example, combining constant multiplication with equation (12) yields:

$$\Delta \arg Y_n(k) = k \cdot \arg Y_n(\mod[k+K/2-1, K]) \quad (16)$$

This is an example of performing constant multiplication for a term to undergo shift addition by k corresponding to the position of the term.

Furthermore, it is possible to replace a plurality of phase samples. For example, k ($0 \le k < K/2$) can be alternately applied with:

$$\begin{cases} \Delta \arg Y_n(k) = -\arg Y_n(k) + \arg Y_n(\mod[K-k+1, K]) \\ \Delta \arg Y_n(\mod[K-k+1, K]) = -\arg Y_n(\mod[K-k+1, K]) + \arg Y_n(k) \end{cases} \quad (17)$$

An arbitrary integer smaller than K may be used, instead of 1.

Selective sign inversion of the phase, shift addition, constant multiplication, and replacement have been described above. These processes can be selectively applied in accordance with the value of $\arg Y_n(k)$. For example, it is possible to apply the above-described processes only when the value of $\arg Y_n(k)$ takes a positive value. Exemplifying the processing indicated by equation (12) yields:

$$\Delta \arg Y_n(k) = \frac{\text{sgn}(\arg Y_n(k)) + 1}{2} \cdot \arg Y_n(\mod[k+K/2-1, K]) \quad (18)$$

where sgn(•) represents an operator for extracting a sign. A fraction on the right-hand side becomes 1 only when the phase takes a positive value, and becomes zero otherwise. It is therefore possible to selectively apply the processes in accordance with the value of $\arg Y_n(k)$. The correlation elimination processes using the rotation amount are different in the degree of correlation elimination and the necessary calculation amount. In actual application, in consideration of the degree of correlation elimination and the necessary calculation amount, appropriate processing is selected and used or the processes are used in combination.

As another correlation elimination method, there is provided a method of obtaining the correlation of the phase samples $\arg Y_n(k)$ and eliminating the obtained correlation. For example, consider a case in which $\arg Y_n(k)$ is represented by linear combination of N−1 adjacent samples. This establishes:

$$\arg Y_n(k) = \sum_{j=\mod(k-K+1,K)}^{k-1} a_j \arg Y_n(j) + \delta_L(k) \quad (19)$$

Alternatively, paying attention to the correlation in the opposite direction can yield:

$$\arg Y_n(k) = \sum_{j=k+1}^{\mod(k+K-1,K)} a_j \arg Y_n(j) + \delta_R(k) \quad (20)$$

Note that $\delta_L(k)$ and $\delta_R(k)$ represent uncorrelated components (components with no correlation).

Modifying $\arg Y_n(k)$ using the relationship yields:

$$\Delta \arg Y_n(k) = -\sum_{j=\mod(k-K+1,K)}^{k} a_j \arg Y_n(j) \quad (21)$$

or $$\Delta \arg Y_n(k) = -\sum_{j=k}^{\mod(k+K-1,K)} a_j \arg Y_n(j) \quad (22)$$

In the above equations, it is not necessary to use all nonzero values $a_j$. By using some values $a_j$, it is possible to reduce the calculation amount.

Although the correlation elimination effect decreases, it is possible to minimize a decrease in effect by selectively using large values $a_j$. As an example, by using only the largest value $a_j$, phase correlation elimination is performed based on:

$$\Delta \arg Y_n(k) = -a_{j\,max} \arg Y_n(j\,max) \quad (23)$$

where jmax represents the value of j with which a correlation coefficient a takes a largest value. As compared with correlation elimination using N samples, it is possible to reduce the calculation amount necessary for correlation elimination.

The coefficient $a_j$ in the above linear correlation equations is known as a linear prediction coefficient (LPC) in voice encoding. It is possible to obtain the LPC at high speed by using a Levinson-Durbin recursion method. Also, it is possible to obtain the LPB using a coefficient update algorithm for an adaptive filter represented by a normalized LMS algorithm by using the difference (error) between the original phase sample value and the prediction result.

The correlation may be eliminated by assuming linear combination of $K_j-1$ samples ($K_j < K$), instead of linear combination of K−1 adjacent samples. By decreasing the number of samples assumed for linear combination in this way, it is possible to reduce the calculation amount necessary for correlation elimination.

A case in which $\arg Y_n(k)$ is represented by linear combination of K−1 adjacent samples has been exemplified. Similarly, a case in which $\arg Y_n(k)$ is represented by nonlinear combination of K−1 samples is possible. That is, this establishes:

$$\arg Y_n(k) = f_{NL}[\arg Y_n(j)]|_{0 \le j < K, j \ne k} + \delta(k) \quad (24)$$

where $f_{NL}[\bullet]$ represents a nonlinear function, and $\delta(k)$ represents an uncorrelated component. In this case, the rotation amount used for correlation elimination can be obtained by:

$$\Delta \arg Y_n(k) = -f_{NL}[\arg Y_n(j)]|_{0 \le j < K, j \ne k} \quad (25)$$

Correlation elimination using the nonlinear function can sufficiently eliminate the correlation when data have a nonlinear correlation.

The nonlinear function can be generally approximated by a polynomial. When approximating the nonlinear function $f_{NL}[\bullet]$ by a polynomial of $\arg Y_n(j)$, the kinds of $\arg Y_n(j)$ are limited, and its order can also be limited. If, for example, only $\arg Y_n(k)$, $\arg Y_n(k+1)$, and the squares of them are used, $f_{NL}[\bullet]$ is approximated by only the four kinds of terms including $\arg Y_n(k)$, $\arg Y_n(k+1)$, and the squares of them. Approximation of the nonlinear function can reduce the calculation amount necessary for correlation elimination.

The change amount generator 203 may generate a phase rotation amount based on, for example, random numbers. In this case, the phase controller 202 rotates the deteriorated signal phase spectrum at each frequency using the rotation amount generated based on the random numbers by the change amount generator 203.

The random numbers include uniform random numbers whose rates of occurrence are uniform, and normal random numbers whose rates of occurrence have a normal distribution. A method of generating a rotation amount based on uniform random numbers will be described. Uniform random numbers are generated by a linear congruential method or the like. In this example, uniform random numbers generated by the linear congruential method will be exemplified to continue the following description. The random numbers generated by the linear congruential method are uniformly distributed within a range from 0 to $(2^M)-1$.

Note that M is an arbitrary integer. Phase rotation amounts $\phi$ need to be distributed within a range from 0 to $2\pi$. To do this, the generated uniform random numbers are transformed to be distributed within the range from 0 to $2\pi$. Transformation is performed by:

$$\phi = 2\pi \frac{R}{R_{max}} \quad (26)$$

where R represents a uniform random number, and $R_{max}$ represents a possible maximum value of the generated uniform random numbers. When the uniform random numbers are generated by the above-described linear congruential method, $R_{max}=(2^M)-1$.

To simplify calculation, the value R may be directly set as a phase rotation amount. Since the value represents a rotation amount, $2\pi$ indicates just one rotation. When the phase is rotated by $2\pi$, this is equivalent to a case in which no rotation is performed. Consequently, a ration amount of $2\pi+\alpha$ is equivalent to a rotation amount of $\alpha$. A case in which uniform random numbers are generated by the linear congruential method has been explained. However, even if uniform random numbers are generated by another method, it is only necessary to obtain a rotation amount $\phi$ by equation (26).

The phase controller 202 receives the rotation amount from the change amount generator 203, and rotates the deteriorated signal phase spectrum. If the deteriorated signal phase spectrum is expressed by an angle, the phase controller 202 rotates the deteriorated signal phase spectrum by adding the value of the rotation amount $\phi$ to the angle. If the deteriorated signal phase spectrum is expressed by a normal vector of a complex number, the phase controller 202 rotates the deteriorated signal phase spectrum by obtaining a normal vector of the rotation amount $\phi$, and multiplying the deteriorated signal phase spectrum by the normal vector.

The normal vector of the rotation amount $\phi$ is obtained by:

$$\Phi = \cos(\phi) + j\sin(\phi) \quad (27)$$

where $\Phi$ represents a rotation vector, and j represents sqrt(−1). Note that sqrt indicates a square root.

<<Operation of Phase Controller 202>>

The phase controller 202 obtains the enhanced signal phase spectrum 240 arg $X_n(k)$ by adding the rotation amount $\Delta$arg $Y_n(k)$ supplied from the change amount generator 203 to the deteriorated signal phase spectrum 220 supplied from the transformer 201, and supplies the obtained enhanced signal phase spectrum 240 to the inverse transformer 204. That is, this executes:

$$\arg X_n(k) = \arg Y_n(k) + \Delta\arg Y_n(k) \quad (28)$$

The phase controller 202 can obtain the enhanced signal phase spectrum 240 arg $X_n(k)$ by replacing the rotation amount $\Delta$arg $Y_n(k)$ supplied from the change amount generator 203 with the deteriorated signal phase spectrum 220 supplied from the transformer 201 without adding the change amount to the deteriorated signal phase spectrum 220, and supply the enhanced signal phase spectrum 240 to the inverse transformer 204. That is, the phase rotation amount equals the replacement amount of the phase by executing:

$$\arg X_n(k) = \arg Y_n(k) - \arg Y_n(k) + \Delta\arg Y_n(k) \quad (29)$$

Note that although replacement is implemented by subtracting the enhanced signal phase spectrum itself, and adding the rotation amount in this example, replacement may be implemented by simply replacing phase data with the replacement amount.

As described above, the shape of the deteriorated signal phase spectrum 220 is changed when the phase controller 202 changes the value of $\Delta$arg $Y_n(k)$ by using the change amount $\Delta$arg $Y_n(k)$ generated by the change amount generator 203. The change of the shape weakens the correlation of the deteriorated signal phase spectrum 220, thereby weakening the feature of the input signal.

Note that it is also possible to apply phase unwrapping prior to the phase processing described above. This is because the deteriorated signal phase spectrum 220 has a range of $\pm\pi$ as a value range. That is, phase unwrapping is performed not to limit the value range to the range of $\pm\pi$. Performing phase unwrapping makes it possible to obtain the correlation indicated by equation (17), (18), or (22) at high accuracy. Various methods can be applied for phase unwrapping, as described in B. Rad and T. Virtanen, "Phase spectrum prediction of audio signals," Proc. ISCCSP2012, CD-ROM, May 2012 (non-patent literature 7) and S. T. Kaplan and T. J. Ulrych, "Phase Unwrapping: A review of methods and a novel technique," Proc. 2007 CSPG CSEG Cony. pp. 534-537, May 2007 (non-patent literature 8).

(Third Embodiment)

<<Overall Arrangement>>

Figure 5:
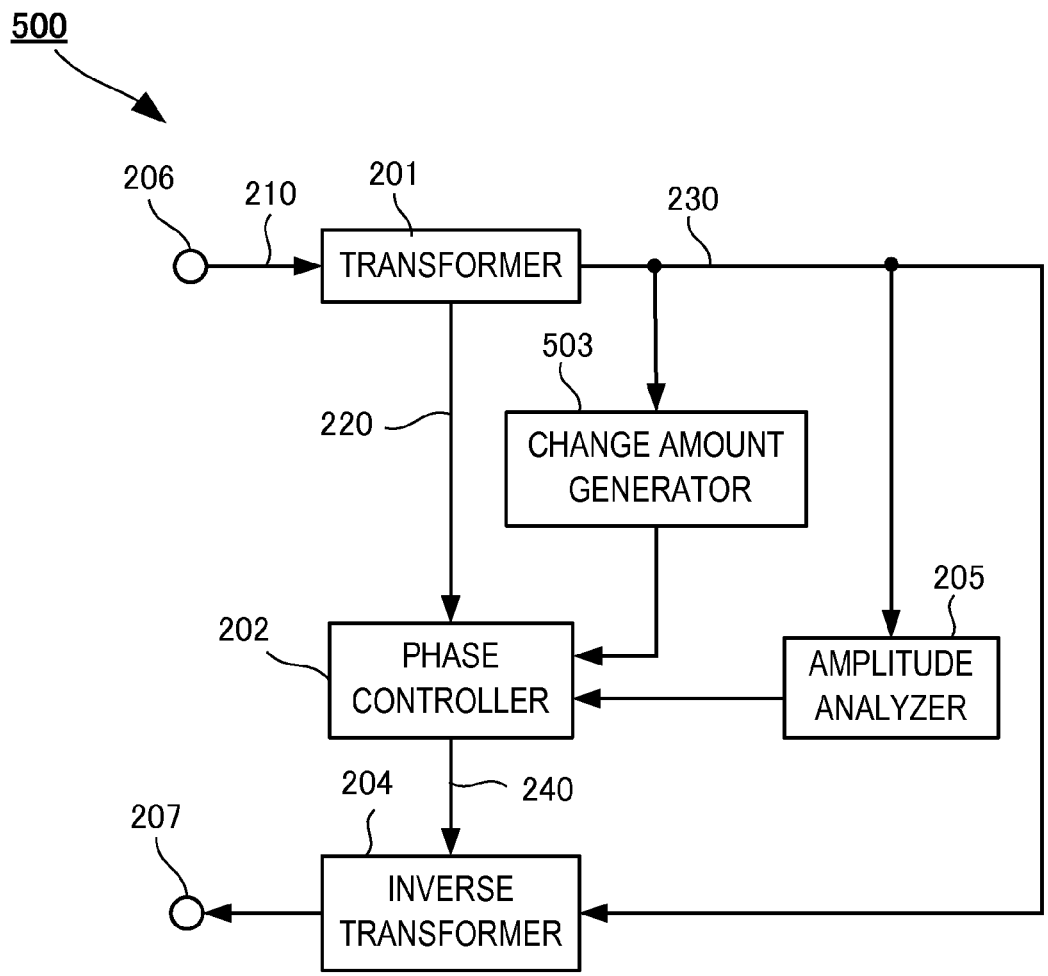
FIG. 5 is a block diagram showing the schematic arrangement of a noise suppression apparatus according to the third embodiment of the present invention.

A noise suppression apparatus 500 according to the third embodiment of the present invention will be described with reference to FIG. 5. FIG. 5 is a block diagram showing the overall arrangement of the noise suppression apparatus 500. The noise suppression apparatus 500 according to this embodiment is the same as the noise suppression apparatus 200 according to the second embodiment except for a change amount generator 503. Only the change amount generator 503 will be explained and a detailed description of the remaining components will be omitted.

<<Arrangement of Change Amount Generator 503>>

Figure 6:
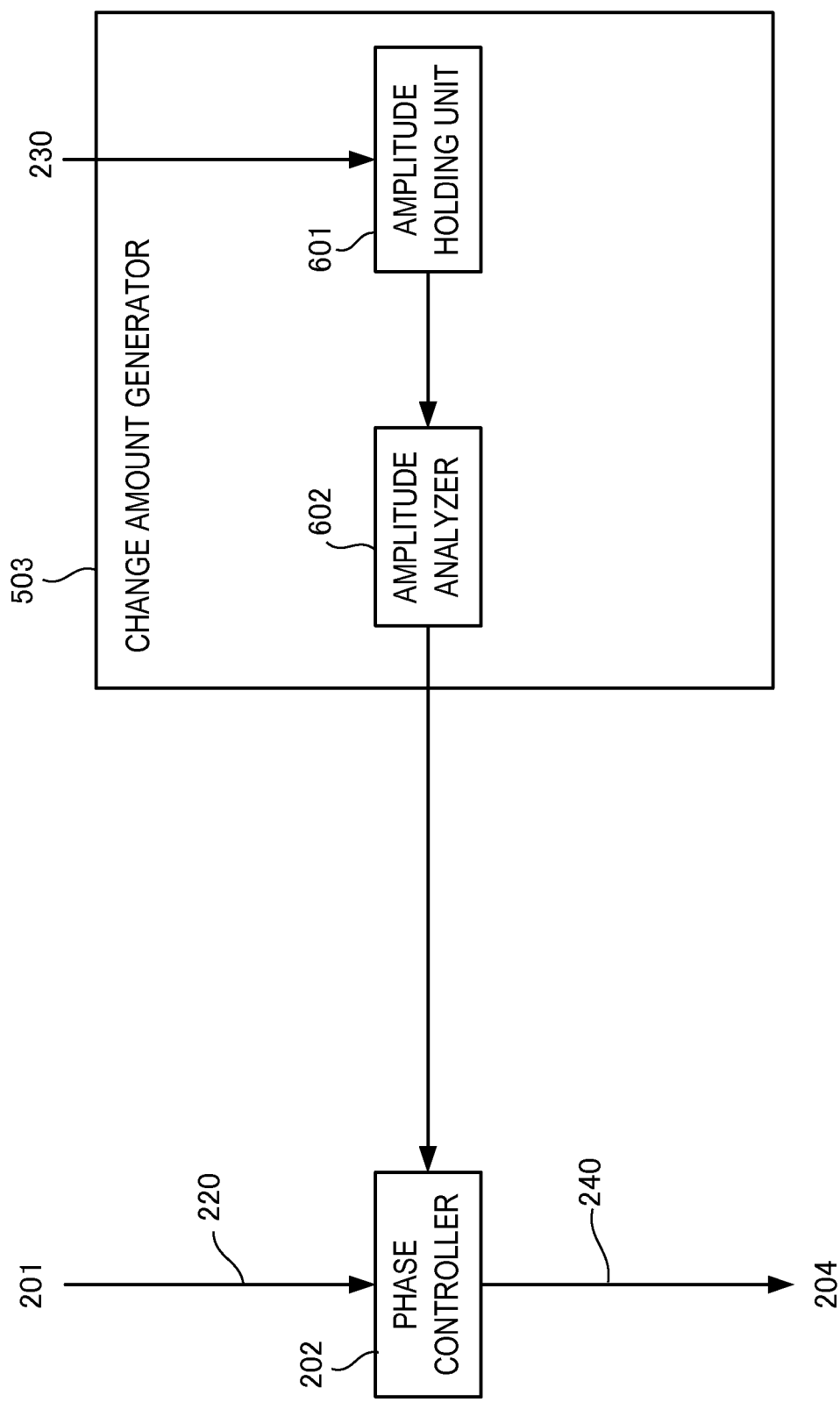
FIG. 6 is a block diagram showing the schematic arrangement of a change amount generator included in the noise suppression apparatus according to the third embodiment of the present invention.

FIG. 6 is a block diagram showing the arrangements of a phase controller 202 and the change amount generator 503. As shown in FIG. 6, the change amount generator 503 includes an amplitude holding unit 601 and an amplitude analyzer 602. The amplitude holding unit 601 holds a deteriorated signal amplitude spectrum 230, and supplies it to the amplitude analyzer 602.

A transformer 201 supplies a deteriorated signal phase spectrum 220 to the phase controller 202, and the change amount generator 503 supplies a phase rotation amount to the phase controller 202. The phase controller 202 rotates (shifts) the deteriorated signal phase spectrum 220 by the rotation amount supplied from the change amount generator 503, and supplies the rotation result as an enhanced signal phase spectrum 240 to an inverse transformer 204.

<<Rotation Amount Calculation 1 Using Amplitude>>

For example, the amplitude analyzer 602 sets, as a rotation amount, a product obtained by multiplying the deteriorated signal amplitude spectrum held in the amplitude holding unit

601 by 7E. Alternatively, even if the deteriorated signal amplitude spectrum held in the amplitude holding unit 601 is directly set as a rotation amount, the same effects are obtained. The phase controller 202 changes (rotates or replaces) the deteriorated signal phase spectrum at each frequency by using the change amount generated by the change amount generator 503 based on the deteriorated signal amplitude spectrum. Under the control of the phase controller 202, the shape of the deteriorated signal phase spectrum 220 changes. The change of the shape can weaken the feature of noise.

<<Rotation Amount Calculation 2 Using Amplitude>>

The amplitude analyzer 602 may supply, as a rotation amount, the result of normalizing the deteriorated signal amplitude spectrum 230 held in the amplitude holding unit 601 to the phase controller 202. In this case, the amplitude analyzer 602 first obtains the average of the deteriorated signal amplitude spectra 230 (K positive values). The amplitude analyzer 602 obtains a product by multiplying, by π, a quotient obtained by dividing the deteriorated signal amplitude spectrum by the obtained average value, and sets the product as a rotation amount. Note that if the quotient is directly set as a rotation amount without multiplying the quotient by π, the similar effects are obtained. Since a variance can be made large with respect to a case in which no normalization is performed, the correlation elimination effect for a rotated phase can be enhanced. Also, the average can be obtained after excluding a value (outlier) extremely different from the remaining values. This can eliminate the adverse effect of the outlier, thereby obtaining a more effective rotation amount.

<<Rotation Amount Calculation 3 Using Amplitude>>

The amplitude analyzer 602 can normalize the distribution of the deteriorated signal amplitude spectra 230, and then set a rotation amount. First, the amplitude analyzer 602 obtains a maximum value $|X_n|_{max}$ and a minimum value $|X_n|_{min}$ of the deteriorated signal amplitude spectra 230 (K positive values). The amplitude analyzer 602 subtracts the minimum value from the deteriorated signal amplitude spectrum, and divides the subtraction result by the difference between the maximum value and the minimum value. A product obtained by multiplying the obtained quotient by π is set as a rotation amount. That is, a rotation amount $\Delta \arg Y_n(k)$ is obtained by:

$$\Delta \arg Y_n(k) = \frac{|X_n(k)_k| - |X_n(k)|_{min}}{|X_n(k)|_{max} - |X_n(k)|_{min}} \cdot \pi \quad (30)$$

By obtaining the rotation amounts in this way, the rotation amounts are distributed between 0 and π. It is, therefore, possible to enhance the correlation elimination effect for a rotated phase. Note that even if the quotient is directly set as a rotation amount without multiplying the quotient by π, the similar effects are obtained.

<<Rotation Amount Calculation 4 Using Amplitude>>

A change amount generator 503 can normalize the distribution of the deteriorated signal amplitude spectra by an envelope, and set the normalization result as a rotation amount. As for the envelope, for example, a regression curve of the deteriorated signal amplitude spectrum is obtained based on N samples, and each sample is divided by the value of the regression curve. The regression curve may be obtained by using some of the N samples, or can be obtained by excluding an outlier. By excluding an outlier, it is possible to eliminate the adverse effect of the outlier, thereby obtaining a more effective rotation amount. The thus obtained quotients are distributed centered on 1.

By applying normalization of the maximum value and minimum value described using equation (30) to the quotient, the rotation amount $\Delta \arg Y_n(k)$ is obtained by:

$$\Delta \arg Y_n(k) = \frac{|\tilde{X}_n(k)_k| - |X_n(k)|_{min}}{|X_n(k)|_{max} - |X_n(k)|_{min}} \cdot \pi \quad (31)$$

where $|\tilde{X}_n(k)|$ represents the deteriorated signal amplitude spectrum normalized by the envelope. By obtaining the rotation amounts, the rotation amounts are uniformly distributed between π and −π, thereby enhancing the correlation elimination effect. Note that even if the quotient is directly set as a rotation amount without multiplying the quotient by π, the similar effects are obtained.

(Fourth Embodiment)

The fourth embodiment of the present invention will be described with reference to FIG. 7. A noise suppression apparatus 700 according to this embodiment is different from the second embodiment in that an amplitude controller 708 is used to compensate for a drop of the output level caused by phase control of a phase controller 202. The remaining components and operations are the same as those in the second embodiment and a description thereof will be omitted.

Figure 8:
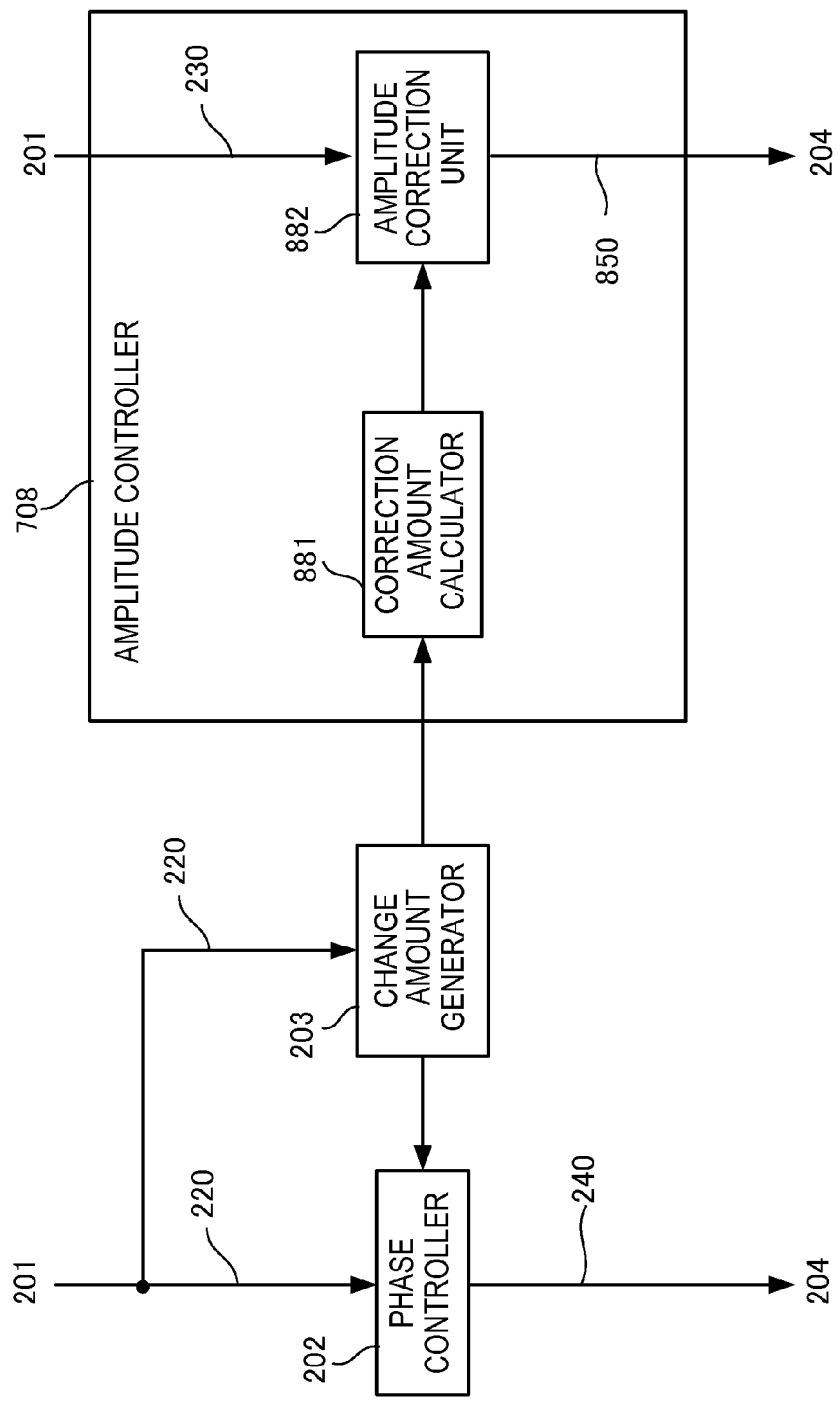
FIG. 8 is a block diagram showing the schematic arrangement of an amplitude controller 708 included in the noise suppression apparatus according to the fourth embodiment of the present invention.

As shown in FIG. 8, the amplitude controller 708 includes a correction amount calculator 881 and an amplitude correction unit 882. The correction amount calculator 881 calculates an amplitude correction coefficient using a phase rotation amount transmitted by a change amount generator 203. The amplitude correction unit 882 multiplies a deteriorated signal amplitude spectrum supplied from a transformer 201 by the calculated amplitude correction coefficient, and supplies the multiplication result to an inverse transformer 204. Multiplication of the amplitude correction coefficient can cancel a drop of the output level when a deteriorated signal phase spectrum 220 is controlled to obtain an enhanced signal phase spectrum 240.

A drop of the output level by phase rotation in correlation elimination will be explained with reference to FIGS. 9 and 10.

FIGS. 9 and 10 show signals when a deteriorated signal is processed by the arrangement shown in the block diagram of FIG. 7. The difference between FIGS. 9 and 10 is the presence/absence of phase rotation. FIG. 9 shows signals when no phase rotation is performed. FIG. 10 shows signals when phase rotation is performed from frame 3.

Signals when no phase rotation is performed will be described with reference to FIG. 9. A deteriorated signal is shown at the top of FIG. 9. A frame divider 301 divides the deteriorated signal into frames. The second signal from the top, which is sectioned by a dotted line, is a signal after frame division. FIG. 9 shows signals of four successive frames. The frame overlapping ratio is 50%.

A windowing unit 302 performs windowing for the signals of the divided frames. The third signal from the top, which is sectioned by a dotted line, is a signal after windowing. In FIG. 9, weighting by a rectangular window is executed to clearly represent the influence of phase rotation.

After that, a Fourier transformer 303 transforms a signal into one in the frequency domain. However, the signal in the frequency domain is not shown in FIG. 9. A lower part below the dotted line of phase rotation illustrates a signal transformed to the time domain by an inverse Fourier transformer 401 of the inverse transformer 204. The fourth signal from the top, which is sectioned by a dotted line, is a signal after phase rotation. Note that no phase rotation is performed in FIG. 9, so the signal does not change from one after windowing.

A windowing unit 402 executes windowing again for an enhanced signal output from the inverse Fourier transformer

401 of the inverse transformer 204. FIG. 9 shows a case in which weighting by a rectangular window is executed. A frame composition unit 403 composes windowed signals. At this time, the times between frames need to be equal to each other. Since the frame overlapping ratio is 50%, frames overlap each other just by half. If no phase rotation is executed, the input signal and output signal coincide with each other, as shown in FIG. 9.

On the other hand, signals when the phase is rotated will be explained with reference to FIG. 10. FIG. 10 shows signals when phase rotation is executed from frame 3. The same deteriorated signal as that shown in FIG. 9 is illustrated at the top of FIG. 10. Signals after frame division and windowing are also the same as those shown in FIG. 9.

FIG. 10 shows a case in which given phase rotation is executed from frame 3. The phase rotation processing shifts signals of frames 3 and 4 in the time direction. The signal having undergone phase rotation is windowed again to perform frame composition. At this time, signals of frames 2 and 3 differ from each other in section ii where frames 2 and 3 overlap each other. As a result, the output signal level after frame composition becomes low in section ii. That is, when phase rotation is executed, the output signal level drops in section ii of FIG. 10.

The drop of the output signal level caused by phase rotation can also be explained by vector composition in the frequency domain by replacing addition in the time domain with addition in the frequency domain.

Figure 11:
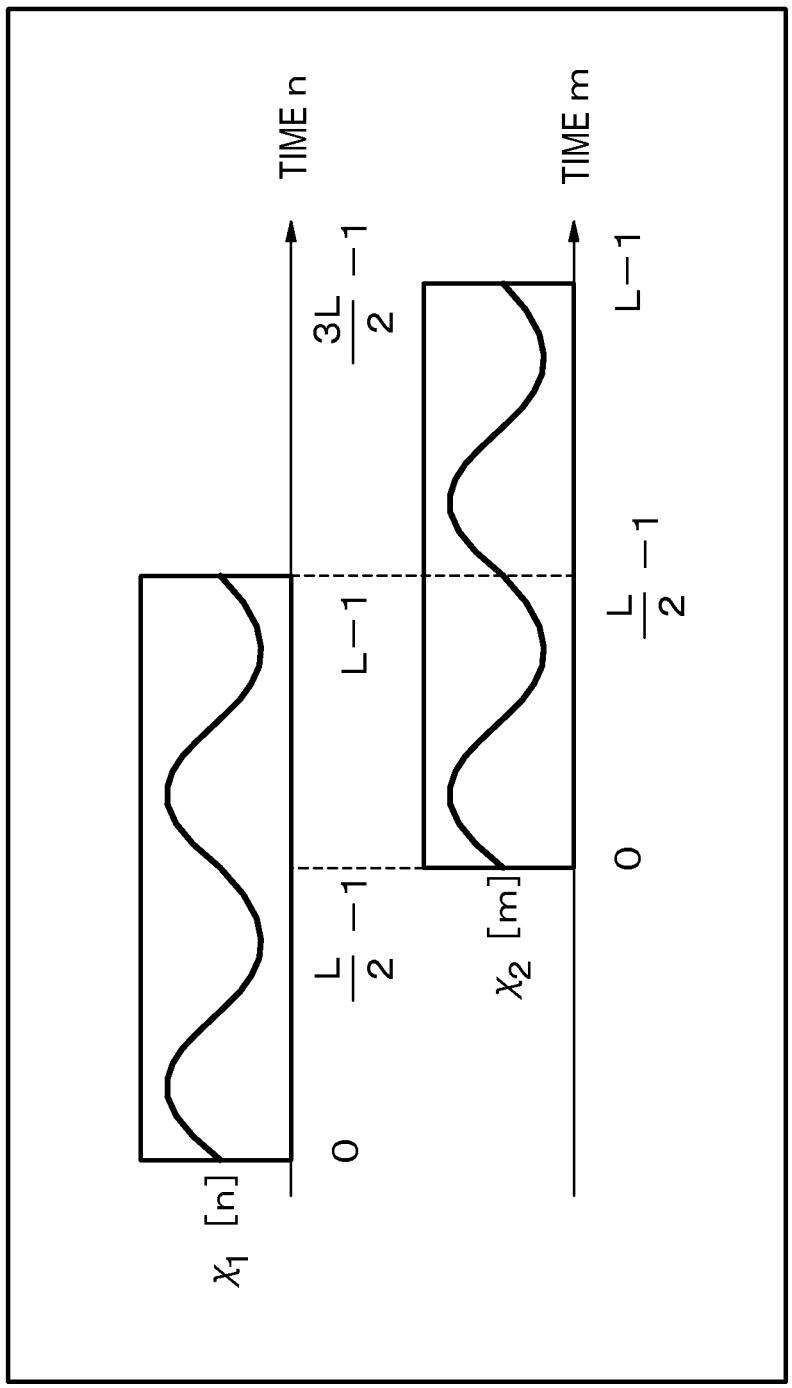
FIG. 11 is a timing chart showing overlap addition of frames when no phase rotation is performed in the frequency domain according to the fourth embodiment of the present invention.

FIG. 11 shows deteriorated signals $x_1[n]$ and $x_2[m]$ of two successive frames after frame division and windowing. Assume that the overlapping ratio is 50%. Note that n represents the discrete time of $x_1$, and m represents the discrete time of $x_2$. The overlapping ratio of 50% yields:

$$m = n + \frac{L}{2} \tag{32}$$

The relationship between $x_1$ and $x_2$ is given by:

$$x_2[m] = x_1\left[n + \frac{L}{2}\right] \tag{33}$$

First, a transform equation from a time domain signal into a frequency domain signal, and an inverse transform equation will be described. Based on Fourier transform of a time domain signal x[n], a frequency domain signal X[k] is given by:

$$X[k] = \sum_{n=0}^{L-1} x[n] e^{-j2\pi \frac{n}{L} k} \tag{34}$$

where k represents the discrete frequency, and L represents the frame length.

Inverse transform to return the frequency domain signal X[k] into the time domain signal x[n] is given by:

$$x[n] = \frac{1}{L} \sum_{k=0}^{L-1} X[k] e^{j2\pi \frac{n}{L} k} \tag{35}$$

Based on this, transform of the time domain signals $x_1[n]$ and $x_2[m]$ into frequency domain signals $X_1[k]$ and $X_2[k]$, respectively, is given by:

$$X_1[k] \sum_{n=0}^{L-1} x_1[n] e^{-j2\pi \frac{n}{L} k} \tag{36}$$

$$X_2[k] \sum_{m=0}^{L-1} x_2[m] e^{-j2\pi \frac{m}{L} k} \tag{37}$$

Based on equation (35), inverse transform to return the frequency domain signals $X_1[k]$ and $X_2[k]$ into the time domain signals $x_1[n]$ and $x_2[m]$, respectively, is given by:

$$x_1[n] = \frac{1}{L} \sum_{k=0}^{L-1} X_1[k] e^{j2\pi \frac{n}{L} k} \tag{38}$$

$$x_2[m] = \frac{1}{L} \sum_{k=0}^{L-1} X_2[k] e^{j2\pi \frac{m}{L} k} \tag{39}$$

The inverse Fourier transformer 401 transforms a frequency domain signal into a time domain signal by inverse Fourier transform. After that, the frame composition unit 403 performs overlap addition of enhanced sounds of preceding and current frames.

For example, at the overlapping ratio of 50% in the illustrated example, the frame composition unit 403 adds adjacent frames in a section of the discrete time m=L/2 to L−1. The addition section m=L/2 to L−1 will be considered.

Substituting equations (38) and (39) into time domain addition yields:

$$x_1[n] + x_2[m] = \frac{1}{L} \sum_{k=0}^{L-1} X_1[k] e^{j2\pi \frac{n}{L} k} + \frac{1}{L} \sum_{k=0}^{L-1} X_2[k] e^{j2\pi \frac{m}{L} k} \tag{40}$$

Furthermore, substituting equations (36) and (37) into the frequency domain signals $X_1[k]$ and $X_2[k]$ in equation (40) yields:

$$x_1[n] + x_2[m] = \frac{1}{L} \sum_{k=0}^{L-1} X_1[k] e^{j2\pi \frac{n}{L} k} + \frac{1}{L} \sum_{k=0}^{L-1} X_2[k] e^{j2\pi \frac{m}{L} k} = \tag{41}$$

$$\frac{1}{L} \sum_{k=0}^{L-1} \left( \sum_{n=0}^{L-1} x_1[n] e^{-j2\pi \frac{n}{L} k} \right) e^{j2\pi \frac{n}{L} k} +$$

$$\frac{1}{L} \sum_{k=0}^{L-1} \left( \sum_{m=0}^{L-1} x_2[m] e^{-j2\pi \frac{m}{L} k} \right) e^{j2\pi \frac{m}{L} k}$$

Equation (41) is expanded into:

$$x_1[n] + x_2[m] = \frac{1}{L} \sum_{k=0}^{L-1} \left( \sum_{n=0}^{L-1} x_1[n] e^{-j2\pi \frac{n}{L} k} \right) e^{j2\pi \frac{n}{L} k} + \tag{42}$$

-continued $$\frac{1}{L}\sum_{k=0}^{L-1}\left(\sum_{m=0}^{L-1}x_2[m]e^{-j2\pi\frac{m}{L}k}\right)e^{j2\pi\frac{m}{L}k} =$$

$$\frac{1}{L}\sum_{k=0}^{L-1}\left(x_1[0]e^{-j2\pi\frac{0}{L}k}+x_1[1]e^{-j2\pi\frac{1}{L}k}+\ldots+x_1[L-1]e^{-j2\pi\frac{L-1}{L}k}\right)$$

$$e^{j2\pi\frac{n}{L}k}+\frac{1}{L}\sum_{k=0}^{L-1}\left(x_2[0]e^{-j2\pi\frac{0}{L}k}+x_2[1]e^{-j2\pi\frac{1}{L}k}+\ldots+x_2[L-1]e^{-j2\pi\frac{L-1}{L}k}\right)e^{j2\pi\frac{m}{L}k} =$$

$$\frac{1}{L}\left\{x_1[0]\sum_{k=0}^{L-1}e^{j\frac{2\pi}{L}(n-0)k}+x_1[1]\sum_{k=0}^{L-1}e^{j\frac{2\pi}{L}(n-1)k}+\ldots+x_1[L-1]\sum_{k=0}^{L-1}e^{j\frac{2\pi}{L}(n-L+1)k}\right\}+$$

$$\frac{1}{L}\left\{x_2[0]\sum_{k=0}^{L-1}e^{j\frac{2\pi}{L}(m-0)k}+x_2[1]\sum_{k=0}^{L-1}e^{j\frac{2\pi}{L}(m-1)k}+\ldots+x_2[L-1]\sum_{k=0}^{L-1}e^{j\frac{2\pi}{L}(m-L+1)k}\right\}$$

Total sum calculation included in each term of equation (42) will be considered. Introducing an arbitrary integer g establishes:

$$\sum_{k=0}^{L-1}e^{j\frac{2\pi}{L}gk} \qquad (43)$$

An inverse Fourier transform of a delta function $\delta[g]$ is given by:

$$\delta[g]=\frac{1}{L}\sum_{k=0}^{L-1}e^{j\frac{2\pi}{L}gk} \qquad (44)$$

The delta function $\delta[g]$ is given by:

$$\delta[g]=\begin{cases}1 & g=0\\0 & g\neq 0\end{cases} \qquad (45)$$

Based on equation (44), equation (43) can be rewritten into:

$$\sum_{k=0}^{L-1}e^{j\frac{2\pi}{L}gk}=L\cdot\delta[g] \qquad (46)$$

From the relation of equation (46), equation (42) can be rewritten into:

$$x_1[n]+x_2[m]= \qquad (47)$$

$$\frac{1}{L}\{L\cdot x_1[0]\delta[0]+L\cdot x_1[1]\delta[n-1]+\ldots+L\cdot x_1[L-1]\delta[n-L+1]\}+$$

$$\frac{1}{L}\{L\cdot x_2[0]\delta[0]+L\cdot x_2[1]\delta[m-1]+\ldots+L\cdot x_2[L-1]\delta[m-L+1]\}$$

Hence, equation (42) is rewritten into:

$$x_1[n]+x_2[m]=\frac{1}{L}\{L\cdot x_1[n]\}+\frac{1}{L}\{L\cdot x_2[m]\}=x_1[n]+x_2[m] \qquad (48)$$

Figure 12:
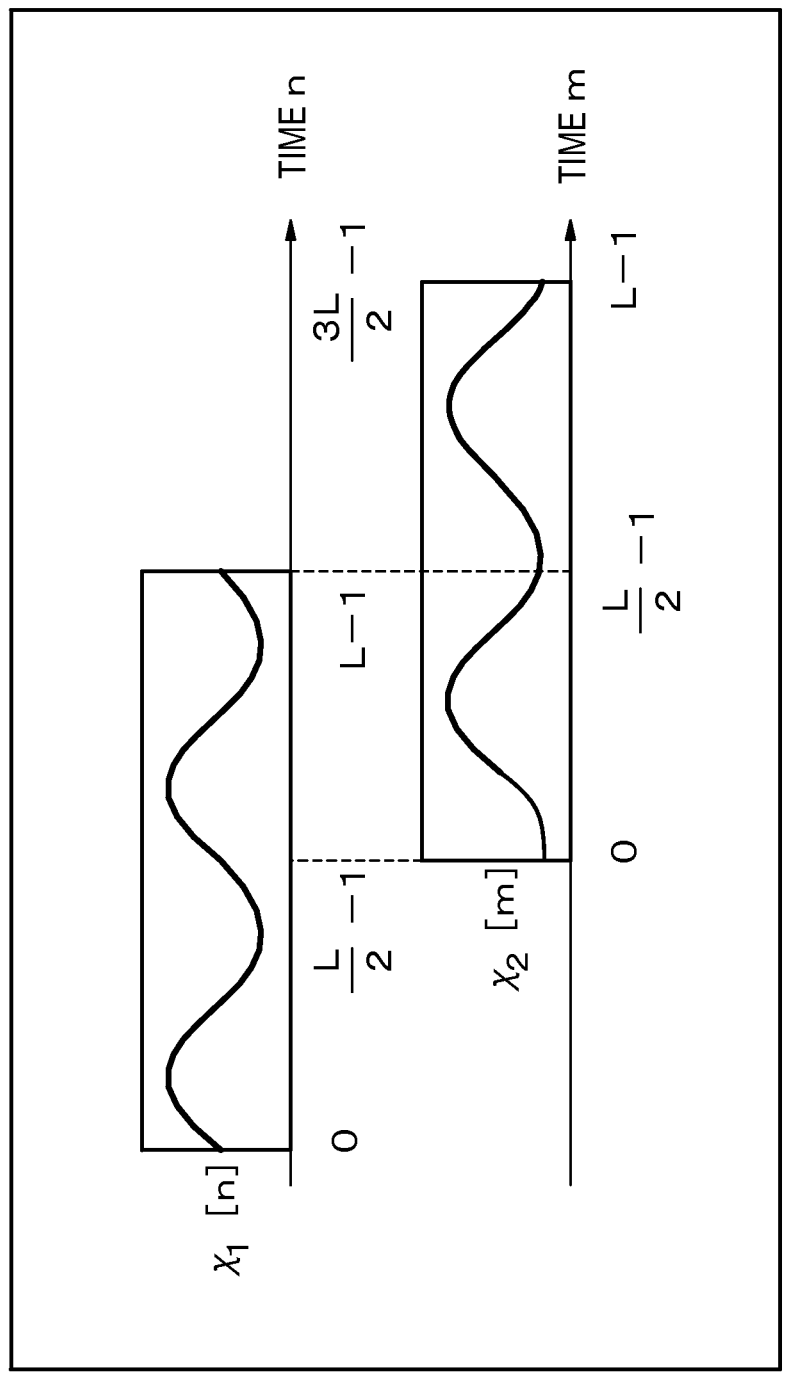
FIG. 12 is a timing chart showing overlap addition of frames when phase rotation is performed in the frequency domain according to the fourth embodiment of the present invention.

A case in which phase rotation is performed for the frequency domain signal $X_2[k]$ will be considered. A time domain signal at this time is as shown in FIG. 12.

When the phase spectrum of $X_2[k]$ is rotated by $\phi[k]$, inverse transform is given by:

$$x_2[m]=\frac{1}{L}\sum_{k=0}^{L-1}X_2[k]e^{j\phi[k]}e^{j2\pi\frac{m}{L}k} \qquad (49)$$

Substituting equation (49) into equation (40) establishes:

$$x_1[n]+x_2[m]=\frac{1}{L}\sum_{k=0}^{L-1}X_1[k]e^{j2\pi\frac{n}{L}k}+\frac{1}{L}\sum_{k=0}^{L-1}X_2[k]e^{j\phi[k]}e^{j2\pi\frac{m}{L}k} = \qquad (50)$$

$$\frac{1}{L}\sum_{k=0}^{L-1}\left(\sum_{n=0}^{L-1}x_1[n]e^{-j2\pi\frac{n}{L}k}\right)e^{j2\pi\frac{n}{L}k}+$$

$$\frac{1}{L}\sum_{k=0}^{L-1}\left(\sum_{m=0}^{L-1}x_2[m]e^{-(j2\pi\frac{m}{L}k+\phi[k])}\right)e^{j2\pi\frac{m}{L}k}$$

Equation (50) is expanded into:

$$x_1[n]+x_2[m]=\frac{1}{L}\left\{x_1[0]\sum_{k=0}^{L-1}e^{j\frac{2\pi}{L}(n-0)k}+\right. \qquad (51)$$

$$\left.x_1[1]\sum_{k=0}^{L-1}e^{j\frac{2\pi}{L}(n-1)k}+\ldots+x_1[L-1]\sum_{k=0}^{L-1}e^{j\frac{2\pi}{L}(m-L+1)k}\right\}+$$

$$\frac{1}{L}\left\{x_2[0]\sum_{k=0}^{L-1}e^{j\frac{2\pi}{L}(n-0)k}e^{j\phi[k]}+x_2[1]\sum_{k=0}^{L-1}e^{j\frac{2\pi}{L}(m-1)k}e^{j\phi[k]}+\right.$$

$$\left.\ldots+x_2[L-1]\sum_{k=0}^{L-1}e^{j\frac{2\pi}{L}(m-L+1)k}e^{j\phi[k]}\right\}$$

Assuming that the overlapping ratio is 50%, the overlapping section n=L/2 to L−1 will be considered. In the overlapping section, equation (51) can be expanded into:

$$x_1\left[n+\frac{L}{2}\right]+x_2[m]= \qquad (52)$$

$$\frac{1}{L}\left\{x_1\left[\frac{L}{2}\right]\sum_{k=0}^{L-1}e^{j\frac{2\pi}{L}(m+\frac{L}{2}-\frac{L}{2})k}+x_1\left[\frac{L}{2}+1\right]\sum_{k=0}^{L-1}e^{j\frac{2\pi}{L}(m-\frac{L}{2}-1-\frac{L}{2}+1)k}+\right.$$

$$\left.\ldots+x_1[L-1]\sum_{k=0}^{L-1}e^{j\frac{2\pi}{L}(m+\frac{L}{2}L+1-L-1)k}\right\}+$$

$$\frac{1}{L}\left\{x_2[0]\sum_{k=0}^{L-1}e^{j\frac{2\pi}{L}(n-0)k}e^{j\phi[k]}+x_2[1]\sum_{k=0}^{L-1}e^{j\frac{2\pi}{L}(n-1)k}e^{j\phi[k]}+\right.$$

-continued $$\ldots + x_2\left[L - \frac{L}{2} - 1\right]\sum_{k=0}^{L-1} e^{j\frac{2\pi}{L}\left(m-\frac{L}{2}-L+1\right)k} e^{j\phi[k]}\Bigg\} =$$

$$\frac{1}{L}\Bigg\{x_2[0]\sum_{k=0}^{L-1} e^{j\frac{2\pi}{L}\pi k} + x_2[1]\sum_{k=0}^{L-1} e^{j\frac{2\pi}{L}\pi k} + \ldots +$$

$$x_2\left[L - \frac{L}{2} - 1\right]\sum_{k=0}^{L-1} e^{j\frac{2\pi}{L}\pi k}\Bigg\} +$$

$$\frac{1}{L}\Bigg\{x_2[0]\sum_{k=0}^{L-1} e^{j\frac{2\pi}{L}(\pi-0)k} e^{j\phi[k]} + x_2[1]\sum_{k=0}^{L-1} e^{j\frac{2\pi}{L}(\pi-1)k} e^{j\phi[k]} +$$

$$\ldots + x_2\left[L - \frac{L}{2} - 1\right]\sum_{k=0}^{L-1} e^{j\frac{2\pi}{L}\left(\pi-\frac{L}{2}-L+1\right)k} e^{j\phi[k]}\Bigg\} =$$

$$\frac{1}{L}\Bigg\{x_2[0]\sum_{k=0}^{L-1} e^{j\frac{2\pi}{L}\pi k}(1 + e^{j\phi[k]}) + x_2[1]\sum_{k=0}^{L-1} e^{j\frac{2\pi}{L}(\pi-1)k}(1 + e^{j\phi[k]}) +$$

$$\ldots + x_2\left[\frac{L}{2} - 1\right]\sum_{k=0}^{L-1} e^{j\frac{2\pi}{L}\left(\pi-\frac{L}{2}-1\right)k}(1 + e^{j\phi[k]})$$

In this case, the parenthesized term (given by expression (53) below) in each term is vector composition.

$$1 + e^{j\phi[k]} \quad (53)$$

When attention is paid to a specific frequency k, a frequency domain signal can be represented as shown in FIG. 13.

Figure 14:
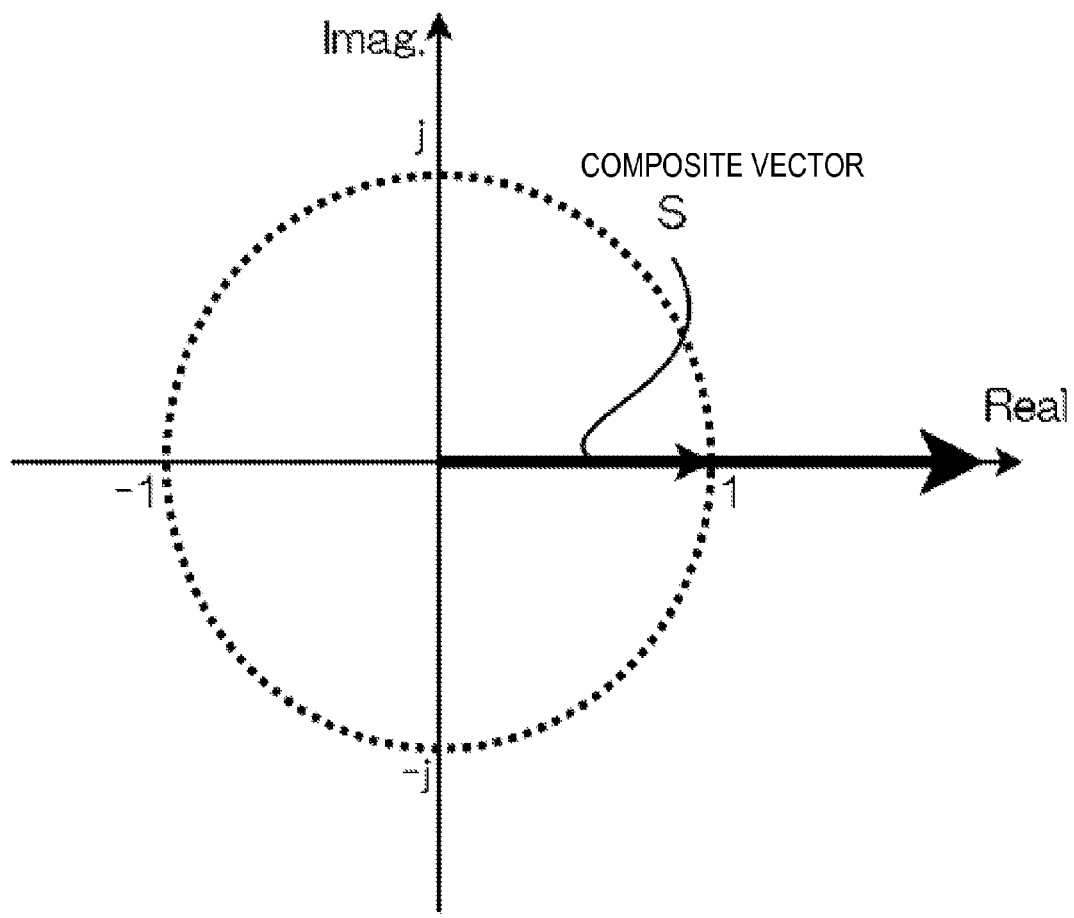
FIG. 14 is a view showing the vector of a frequency domain signal when no phase rotation is performed in the frequency domain according to the fourth embodiment of the present invention.

When no phase rotation is performed, that is, φ[k]=0, a frequency domain signal is as shown in FIG. 14.

The absolute value of expression (53) is given by:

$$|1 + e^{j\phi[k]}| = |1 + \cos\phi[k] + j\sin\phi[k]| \quad (54)$$

$$= \sqrt{(1 + \cos\phi[k])^2 + \sin^2\phi[k]}$$

$$= \sqrt{1 + 2\cos\phi[k] + \cos^2\phi[k] + \sin^2\phi[k]}$$

$$= \sqrt{2(1 + \cos\phi[k])}$$

A condition under which the absolute value indicated by expression (53) is maximized is φ[k]=0, and the absolute value is 2. That is, executing phase rotation decreases the magnitude of an output signal.

To correct the drop of the output signal level, the correction amount calculator 881 decides the amplitude correction amount of the enhanced signal amplitude spectrum.

A correction amount calculation method will be explained in detail. To simplify a problem, attention is paid to variations of the magnitude caused by phase rotation, and respective frequency components are assumed to have been normalized to unit vectors.

First, a case in which no phase rotation is performed will be considered. A composite vector when the phase is the same between successive frames is represented by a vector S shown in FIG. 14. The magnitude |S| of this vector is given by:

$$|S| = \sqrt{\{1+1\}^2} \quad (55)$$

$$= \sqrt{2^2}$$

$$= 2$$

On the other hand, if phase rotation is performed by a normal random number, a composite vector when the phase difference between successive frames is φ is represented by a vector S' shown in FIG. 13. The magnitude |S'| of this vector is given by:

$$|S'| = \sqrt{\{1 + \cos\phi\}^2 + \{\sin\phi\}^2} \quad (56)$$

$$= \sqrt{2 + 2\{\cos\phi\}}$$

An expected value $E(|S'|^2)$ is given by:

$$E(|S'|^2) = E(2 + 2\cos\phi) = E(2) + E(2\cos\phi) \quad (57)$$

For a normal random number, the rate of occurrence of φ is decided by a normal distribution. To obtain an expected power value when phase rotation is performed by a normal random number, therefore, it is necessary to perform weighting based on the rate of occurrence of φ.

More specifically, a weighting function f(φ) based on the rate of occurrence of φ is introduced. The weighting function f(φ) weights cos(φ). Furthermore, normalization using the integral value of the weighting function f(φ) can provide an expected power value.

By introducing the weighting function f(φ) and its integral value into equation (57) which expresses an expected output power value based on a uniform normal random number, an expected output power value $E(S'^2)$ when phase rotation is performed using a normal random number is given by:

$$E(|S'^2|) = E(2) + E\left(2\frac{f(\phi)}{\int_{-\pi}^{\pi} f(\phi)\,d\phi}\cos(\phi)\right) \quad (58)$$

Expressing the weighting function f(φ) by a normal distribution yields:

$$f(\phi) = \frac{1}{\sqrt{2\pi}\,\sigma}\exp\left(-\frac{(\phi-\mu)^2}{2\sigma^2}\right) \quad (59)$$

where σ represents the variance, and μ represents the average.

For example, for a standardized normal distribution having the average μ=0 and the variance σ=1, the weighting function f(φ) is given by:

$$f(\phi) = \frac{1}{\sqrt{2\pi}}\exp\left(-\frac{\phi^2}{2}\right) \quad (60)$$

Substituting equation (60) into equation (58) yields:

$$E(|S'^2|) = E(2) + E\left(2\frac{\exp\left(-\frac{\phi^2}{2}\right)}{\int_{-\pi}^{\pi}\exp\left(-\frac{\phi^2}{2}\right)d\phi}\cos(\phi)\right) \quad (61)$$

Then, numerically calculating the second term on the right-hand side of equation (61) establishes:

$$E(|S'|^2) = 2\{1 + 0.609\} = 3.218 \quad (62)$$

The ratio $E(|S'|^2)$ to $E(|S^2|)$ when no phase rotation is performed is given by:

$$E(|S'|^2)/E(|S|^2) = 3.218/4 = 0.805 \quad (63)$$

When rotating the phase with a normal random number of the standardized normal distribution, the correction amount calculator 881 sets sqrt(1/0.805) as the correction coefficient, and transmits it to the amplitude correction unit 882. The phase controller 202 may perform phase rotation for all or some frequencies. The amplitude controller 708 performs amplitude correction for only frequencies having undergone phase rotation. Therefore, a correction coefficient for frequencies not to undergo phase rotation is set to 1.0. Only a correction coefficient for frequencies having undergone phase rotation is a value derived here.

Although not all the phase rotation characteristics can be completely expressed by a normal distribution, it is possible to apply the above-described correction amount calculation method by approximation using the normal distribution. To do this, it is necessary to collect statistics based on the value of a change amount generated by the change amount generator 203 and its appearance frequency, and obtain the average μ and variance σ of the normal distribution indicated by equation (59). Subsequently, calculation from equation (59) to equation (63) is performed to obtain the square root of the reciprocal of the calculation result as a correction coefficient.

As described above, the noise suppression apparatus 700 according to this embodiment can cause the amplitude controller 708 to eliminate the influence of control of the phase spectrum on an output signal level. Thus, the noise suppression apparatus 700 can obtain a high-quality enhanced signal.

(Fifth Embodiment)

A noise suppression apparatus 1500 according to the fifth embodiment of the present invention will be described with reference to FIG. 15. In this embodiment, the noise suppression apparatus 1500 is different from that in the third embodiment in that an amplitude controller 708 is included. The components except for the amplitude controller 708 are the same as in the third embodiment, and the amplitude controller 708 is the same as in the fourth embodiment. The same reference numerals denote the same components and a detailed description thereof will be omitted.

According to this embodiment, it is possible to efficiently suppress noise derived from a phase by rotating or replacing a deteriorated signal phase spectrum using a deteriorated signal amplitude spectrum or a value obtained from it, and suppress a decrease in output level caused by phase control by controlling an amplitude.

(Sixth Embodiment)

A noise suppression apparatus 1600 according to the sixth embodiment of the present invention will be described with reference to FIG. 16. This embodiment is different from the second embodiment in that the upper limit of a phase rotation amount is limited. The remaining components and operations are the same as those in the second embodiment and a detailed description thereof will be omitted.

FIG. 16 is a block diagram showing the arrangement of the noise suppression apparatus 1600 according to this embodiment. As shown in FIG. 16, the noise suppression apparatus 1600 according to this embodiment includes a change amount limiter 1601 in addition to a change amount generator 203 and phase controller 202 which have been described in the second embodiment. The change amount generator 203 generates a change amount of a deteriorated signal phase spectrum, and supplies it to the phase controller 202 while being limited by the change amount limiter 1601.

The change amount limiter 1601 limits the rotation amount generated by the change amount generator 203 to a given range. That is, the change amount limiter 1601 limits the distribution of φ to an arbitrary range from 0 to 2π. For example, the change amount limiter 1601 limits the distribution of φ to a range from 0 to π/2. This causes the features of the deteriorated signal phase spectrum to remain in the enhanced signal phase spectrum to some extent. The features of the deteriorated signal are held to some extent, as compared with a case in which the phase is completely rotated at random, thereby reducing the influence on a target sound. This reduces the distortion of the target sound.

According to this embodiment, in addition to the effects of the second embodiment, deterioration of a target sound can be reduced by limiting a phase rotation amount.

(Seventh Embodiment)

The seventh embodiment of the present invention will be described with reference to FIG. 17. This embodiment according to the present invention is different from the fourth embodiment in that a phase component is delayed to obtain a phase component difference between frames, and then a correction amount is calculated from the difference. That is, this embodiment is different from the second embodiment in the internal arrangement of an amplitude controller 1708. The remaining components and operations are the same as those in the second embodiment and a description thereof will be omitted.

Figure 17:
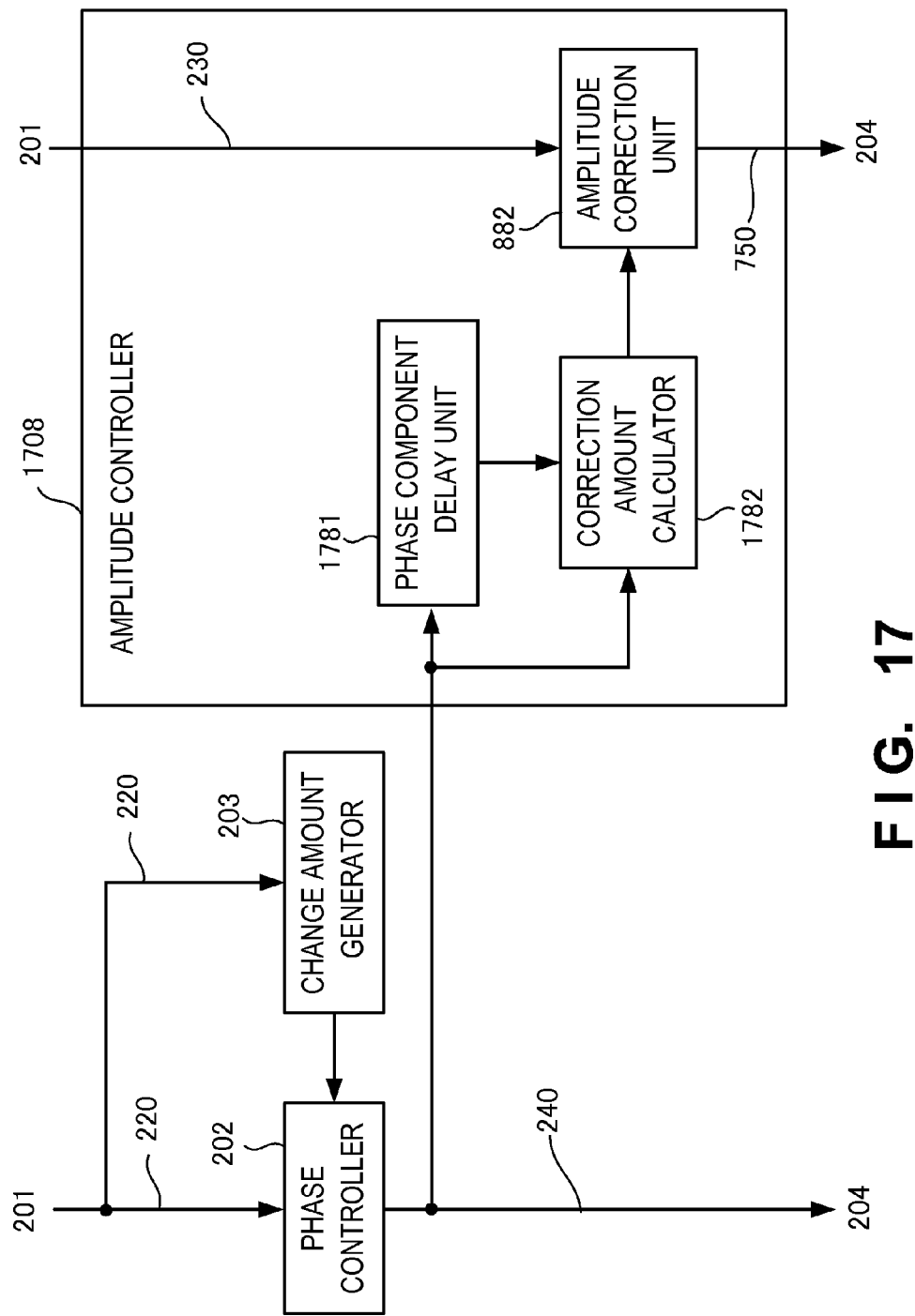
FIG. 17 is a block diagram showing the arrangements of a phase controller and amplitude controller according to the seventh embodiment of the present invention.

FIG. 17 is a block diagram showing the arrangement of the amplitude controller 1708 according to this embodiment. As shown in FIG. 17, a phase controller 202 according to this embodiment supplies a phase after rotation to the amplitude controller 1708. The amplitude controller 1708 includes a phase component delay unit 1781, a correction amount calculator 1782, and an amplitude correction unit 882.

The phase component delay unit 1781 holds an enhanced signal phase spectrum supplied from the phase controller 202 for one frame, and supplies it to the correction amount calculator 1782.

The correction amount calculator 1782 calculates an amplitude correction amount based on the enhanced signal phase spectrum of an immediately preceding frame supplied from the phase component delay unit 1781 and the current enhanced signal phase spectrum supplied from the phase controller 202, and then transmits the calculated amplitude correction amount to the amplitude correction unit 882.

According to this embodiment, in addition to the effects of the second embodiment, it is possible to correct an output level even if the expected value of the output level cannot be derived mathematically based on a phase change amount.

The correction amount calculator 1782 obtains the magnitude of a composite vector at each frequency from the enhanced signal phase spectra of preceding and current frames, and decides a correction coefficient based on the magnitude. Letting α be the phase of a preceding frame and be the phase of a current frame, a magnitude |S'| of a composite vector is given by:

$$|S'| = \sqrt{\{\cos\alpha + \cos\beta\}^2 + \{\sin\alpha + \sin\beta\}^2} \qquad (64)$$
$$= \sqrt{2 + 2\{\sin\alpha\sin\beta\} + 2\{\cos\alpha\cos\beta\}}$$

A magnitude |S| of a composite vector when the phases of successive frames coincide with each other is |S|=2, which has already been derived by equation (55). Therefore, the amplitude correction amount is given by:

$$|S|/|S'| = 2/\sqrt{2 + 2\{\sin\alpha\sin\beta\} + 2\{\cos\alpha\cos\beta\}} \qquad (65)$$

In this embodiment, this value is supplied to the amplitude controller 708 to correct the enhanced signal amplitude spectrum, thereby canceling a drop of the output level. In this embodiment, the components and operations except for the amplitude controller are the same as those in the second embodiment, and a description thereof will be omitted.

(Eighth Embodiment)

Figure 18:
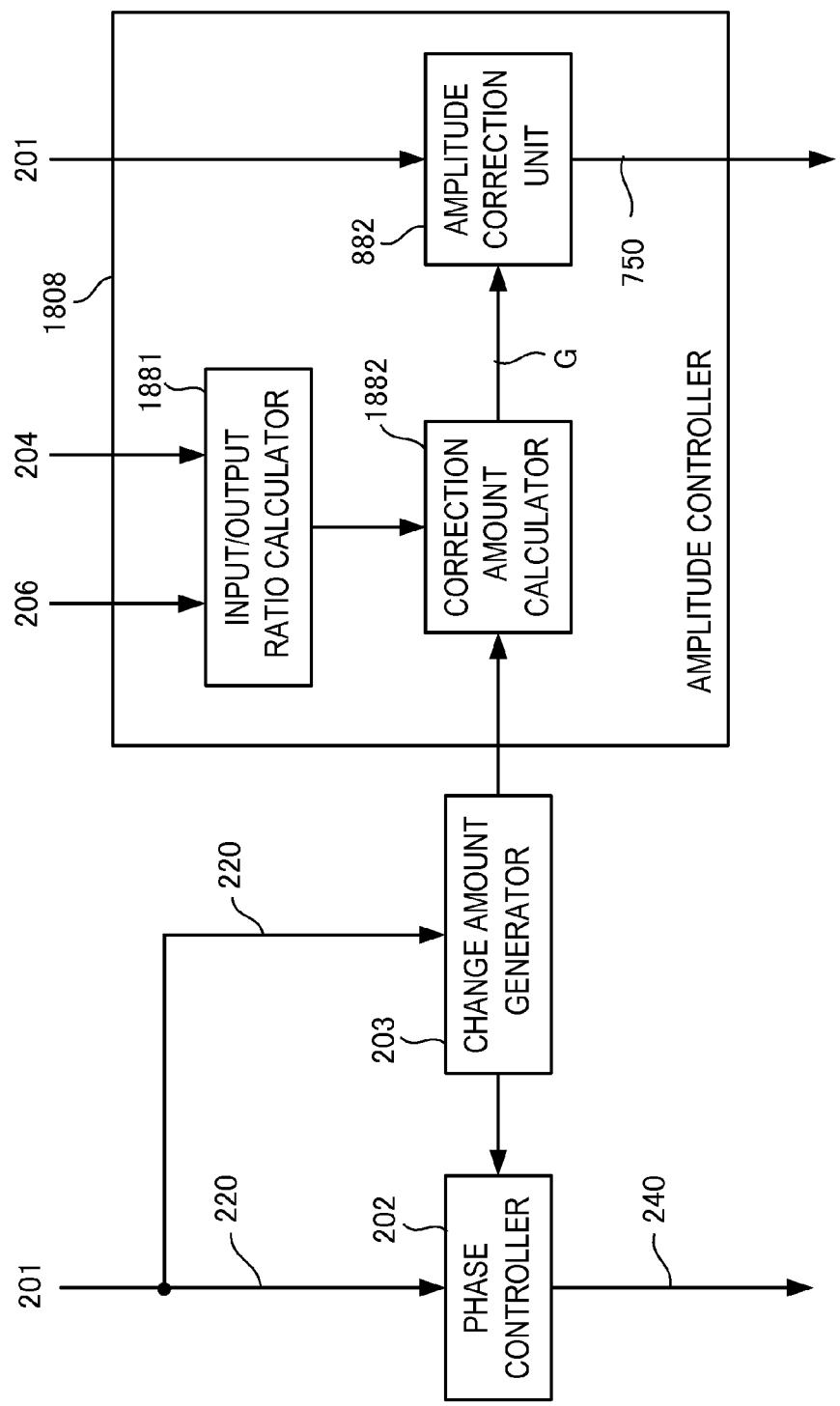
FIG. 18 is a block diagram showing the arrangements of a phase controller and amplitude controller according to the eighth embodiment of the present invention.

The eighth embodiment of the present invention will be explained with reference to FIG. 18. FIG. 18 is a block diagram showing the arrangements of a phase controller 202 and amplitude controller 1808 according to this embodiment.

This embodiment is different from FIG. 8 (the fourth embodiment) in that an input/output ratio calculator 1881 is included. The input/output ratio calculator 1881 receives a deteriorated signal from an input terminal 206 and an enhanced signal from an inverse transformer 204, and calculates an input/output level ratio. The input/output ratio calculator 1881 supplies the input/output level ratio to a correction amount calculator 1882. The correction amount calculator 1882 calculates a correction amount so that the level of the enhanced signal becomes equal to that of the deteriorated signal. An amplitude correction unit 882 corrects an enhanced signal amplitude spectrum by the calculated correction amount.

The input/output ratio calculator 1881 obtains the level ratio from the deteriorated signal and the time domain signal of the enhanced signal.

A level ratio R of an enhanced signal $x_n(t)$ of the nth frame to a deteriorated signal $y_n(t)$ of the nth frame is given by:

$$R = \sum_{t=0}^{L-1} x_n(t) \bigg/ \sum_{t=0}^{L-1} y_n(t) \tag{66}$$

where t represents the sample time, and L represents the frame length of Fourier transform.

The correction amount calculator 1882 obtains an amplitude correction amount G from the ratio value R and the number of frequency components having undergone phase rotation. When a transformer divides the time domain signal into N frequency components and phase rotation is performed for M phase spectra, the amplitude correction amount G is given by:

$$G = \frac{M}{N(R-1)+M} \tag{67}$$

The amplitude correction unit 882 executes amplitude correction for only frequencies having undergone phase rotation based on phase rotation presence/absence information transmitted from a change amount generator 203. In this embodiment, the components and operations except for the input/output ratio calculator 1881 and correction amount calculator 1882 are the same as those in the fourth embodiment, and a description thereof will be omitted.

According to this embodiment, a correction coefficient is obtained from a time domain signal, so the output level can be corrected regardless of a phase replacement amount decision method.

(Ninth Embodiment)

Figure 19:
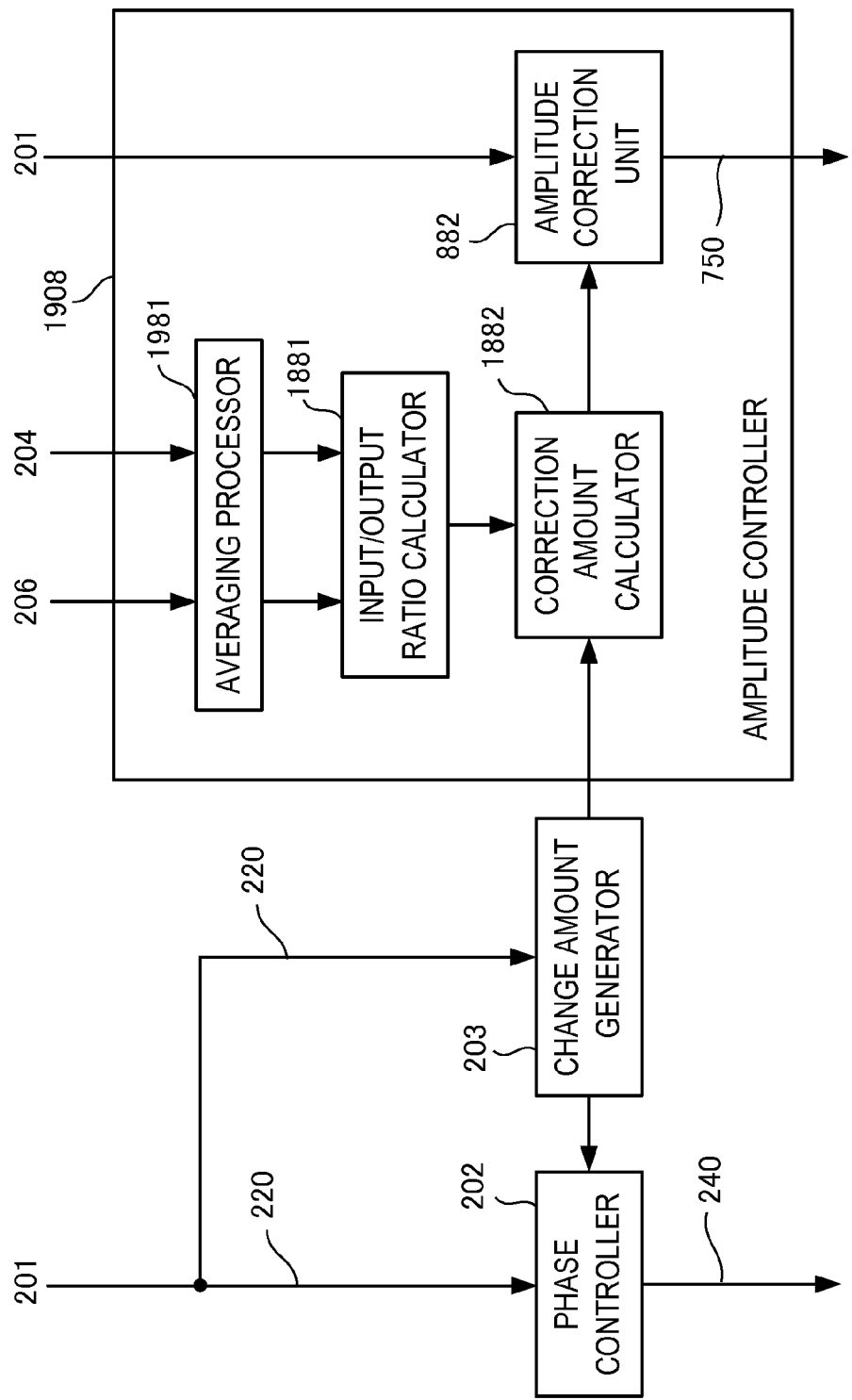
FIG. 19 is a block diagram showing the arrangements of a phase controller and amplitude controller according to the ninth embodiment of the present invention.

The ninth embodiment of the present invention will be described with reference to FIG. 19. FIG. 19 is a block diagram showing the arrangement of an amplitude controller 1908 according to this embodiment. As shown in FIG. 19, the amplitude controller 1908 according to this embodiment includes an averaging processor 1981, in addition to an input/output ratio calculator 1881 included in the eighth embodiment. The components and operations except for the averaging processor 1981 are the same as those in the eighth embodiment, and a description thereof will be omitted.

The averaging processor 1981 receives a deteriorated signal from an input terminal 206, performs averaging processing, and then supplies an average value to the input/output ratio calculator 1881. The averaging processor 1981 receives an enhanced signal from an inverse transformer 204, performs averaging processing, and then supplies an average value to the input/output ratio calculator 1881. The input/output ratio calculator 1881 receives the average values of the deteriorated signal and enhanced signal from the averaging processor 1981, and calculates the level ratio.

The averaging processor 1981 averages the levels of the deteriorated signal and enhanced signal for an arbitrary time length. More specifically, the averaging processor 1981 averages the levels of the deteriorated signal and enhanced signal using a moving average, leakage integral, or the like.

According to this embodiment, in addition to the effects of the eighth embodiment, since an averaged level is used, variations of the correction amount can be suppressed to improve the quality of an output signal.

(10th Embodiment)

Figure 20:
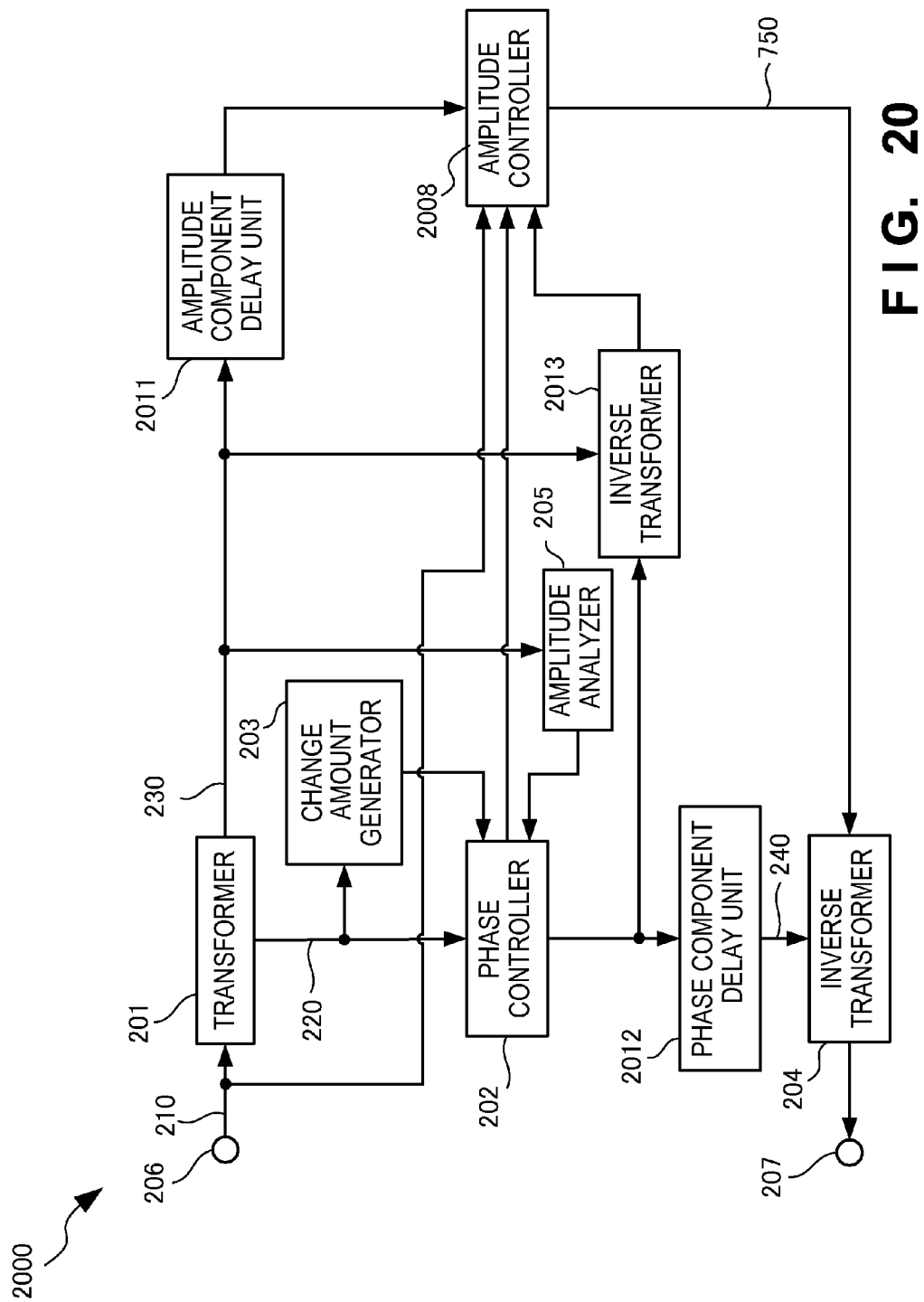
FIG. 20 is a block diagram showing the schematic arrangement of a noise suppression apparatus according to the 10th embodiment of the present invention.

The 10th embodiment of the present invention will be described with reference to FIGS. 20 and 21. FIG. 20 is a block diagram showing the arrangement of a noise suppression apparatus 2000 according to this embodiment. The noise suppression apparatus 2000 according to this embodiment includes an amplitude component delay unit 2011, a phase component delay unit 2012, and an inverse transformer 2013, in addition to the arrangement shown in FIG. 2 of the second embodiment. This embodiment is also different from the second embodiment in the internal arrangement of an amplitude controller 2008. In this embodiment, operations except for those of the amplitude component delay unit 2011, phase component delay unit 2012, and amplitude controller 2008 are the same as those in the second embodiment, and a description thereof will be omitted.

A deteriorated signal 210 supplied to an input terminal 206 is supplied to a transformer 201 and the amplitude controller 2008. The transformer 201 supplies a deteriorated signal amplitude spectrum 230 to the amplitude component delay unit 2011 and inverse transformer 2013. The transformer 201 also supplies a deteriorated signal phase spectrum 220 to a phase controller 202 and a change amount generator 203. The phase controller 202 controls the deteriorated signal phase spectrum 220 supplied from the transformer 201 by using a change amount generated by the change amount generator 203, and supplies it as an enhanced signal phase spectrum to the inverse transformer 2013 and phase component delay unit 2012. Also, the change amount generator 203 transmits the presence/absence of phase rotation at each frequency to the amplitude controller 2008.

By using the deteriorated signal amplitude spectrum 230 supplied from the transformer 201 and the deteriorated signal phase spectrum supplied from the phase controller 202, the inverse transformer 2013 transmits, to the amplitude controller 2008, a signal whose level has dropped due to phase rotation.

The amplitude component delay unit 2011 delays the deteriorated signal amplitude spectrum 230 supplied from the transformer 201, and supplies it to the amplitude controller 2008.

The phase component delay unit 2012 delays the enhanced signal phase spectrum supplied from the phase controller 202, and supplies it to an inverse transformer 204. The amplitude controller 2008 generates a corrected amplitude spectrum 750 by controlling the deteriorated signal amplitude spectrum supplied from the amplitude component delay unit 2011 by using the output of the inverse transformer 2013 and the deteriorated signal 210.

The inverse transformer 204 performs inverse transform by composing an enhanced signal phase spectrum 240 supplied from the phase controller 202 via the phase component delay unit 2012 and the corrected amplitude spectrum 750 supplied from the amplitude controller 2008, and supplies the inverse transform result as an enhanced signal to an output terminal 207.

The phase controller 202 controls the deteriorated signal phase spectrum 220, and the inverse transformer 2013 transforms the deteriorated signal phase spectrum 220 into a time domain signal. By using this signal and the deteriorated signal 210, the amplitude controller 2008 obtains the amount of a variation in level caused by phase rotation.

Since the variation amount arises from a variation caused by only rotation processing by the phase controller 202. The amplitude controller 2008 can, therefore, accurately grasp a variation in level caused by phase rotation. Although the amplitude controller 2008 executes amplitude correction using the level ratio, the obtained level ratio is one for an immediately preceding frame.

Thus, the amplitude component delay unit 2011 and phase component delay unit 2012 are introduced, and the amplitude controller 2008 performs amplitude correction for the frequency component of an immediately preceding frame.

Figure 21:
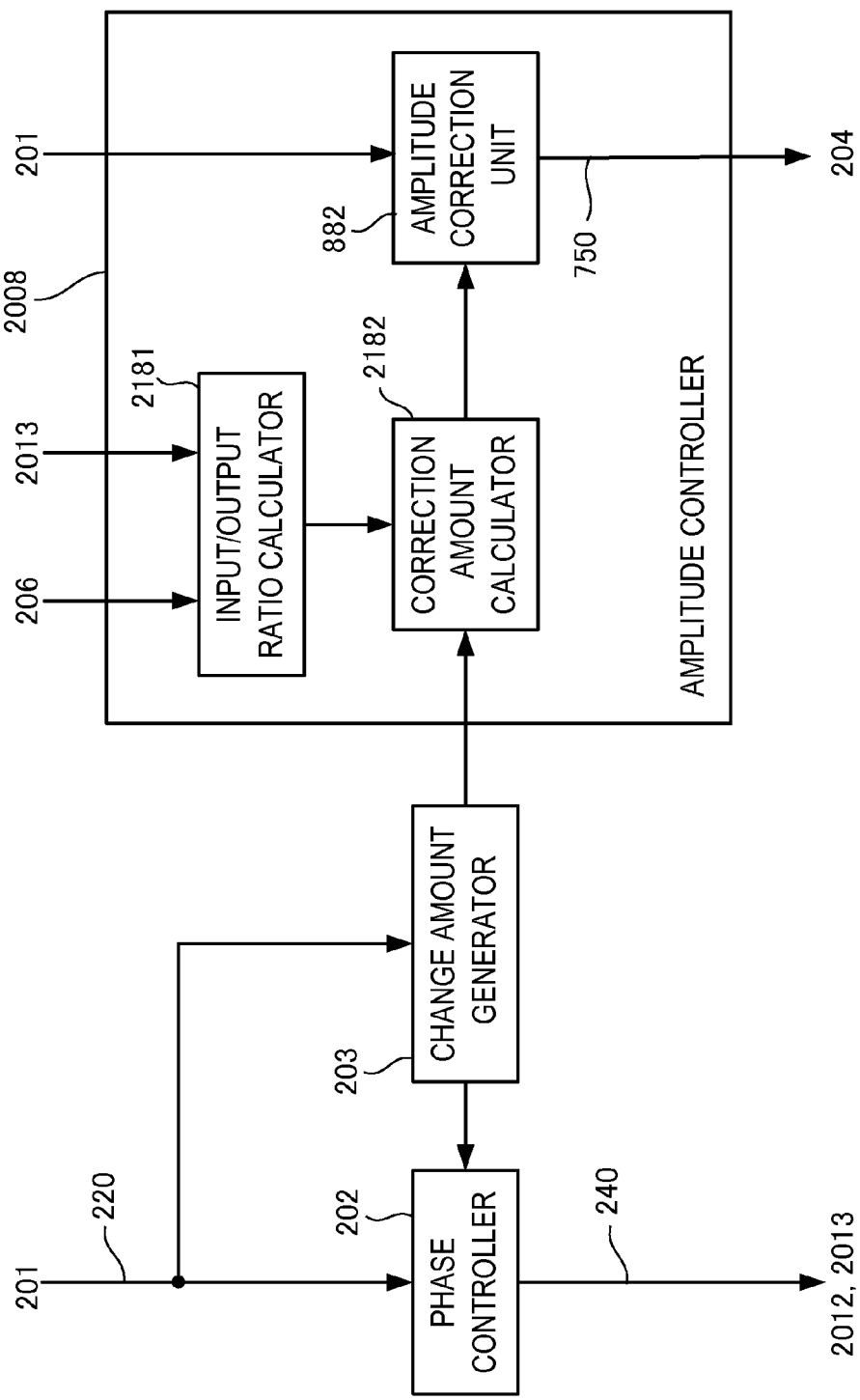
FIG. 21 is a block diagram showing the arrangements of a phase controller and amplitude controller according to the 10th embodiment of the present invention.

FIG. 21 is a block diagram for explaining the internal arrangements of the phase controller 202 and amplitude controller 2008 according to this embodiment. An input/output ratio calculator 2181 calculates a level ratio from a deteriorated signal supplied from the input terminal 206 and a signal which is supplied from the inverse transformer 2013 and contains a level drop caused by phase rotation, and supplies the level ratio to a correction amount calculator 2182.

The correction amount calculator 2182 receives phase rotation presence/absence information at each frequency from the change amount generator 203, and calculates an amplitude correction amount. An amplitude correction unit 882 corrects the enhanced signal phase spectrum at each frequency based on the amplitude correction amount, and supplies it to the inverse transformer 204.

In addition to the effects of the eighth embodiment, the noise suppression apparatus 2000 according to this embodiment can avoid a delay of the input/output ratio that is inevitable in the eighth and ninth embodiments, thereby correcting the output level more accurately.

(11th Embodiment)

Figure 22:
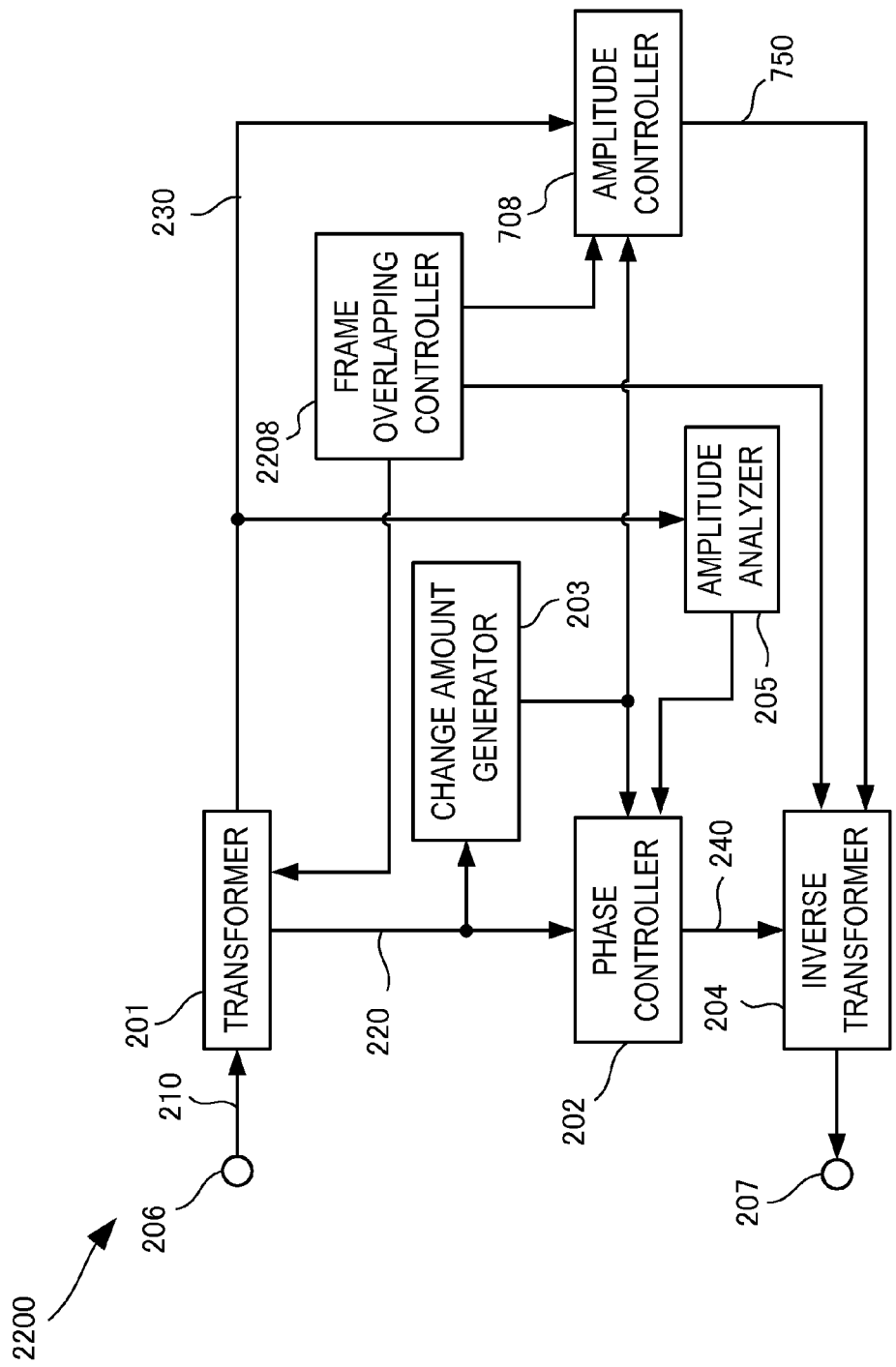
FIG. 22 is a block diagram showing the schematic arrangement of a noise suppression apparatus according to the 11th embodiment of the present invention.

The 11th embodiment of the present invention will be described with reference to FIG. 22. As shown in FIG. 22, a noise suppression apparatus 2200 according to this embodiment includes a frame overlapping controller 2208, in addition to the arrangement of the fourth embodiment. The frame overlapping controller 2208 controls an overlapping ratio when frame division and composition are performed in a transformer 201 and inverse transformer 204. The frame overlapping controller 2208 supplies the overlapping ratio to an amplitude controller 708. As described above, overlapping causes a level drop in phase rotation. The amount of level drop changes depending on the overlapping ratio. As the overlapping ratio increases, the drop amount also increases. Therefore, when the overlapping ratio changes, it is necessary to control an amplitude correction amount. More specifically, the correction amount is obtained by using, as a reference, an amplitude correction amount G for an overlapping ratio of 50%.

When the overlapping ratio is 0%, no amplitude correction is necessary. When the overlapping ratio is 50%, the amplitude correction amount is G. Thus, by using the ratio between a frame length L and an overlapping length Q, the amplitude correction amount is given by:

$$G' = \left(1 - \frac{2Q}{L}\right) \cdot 1 + \frac{2Q}{L}G = 1 + \frac{2Q}{L}(G-1) \tag{68}$$

where G' represents the amplitude correction amount when correction based on the overlapping ratio is performed.

For example, the fact that Q=L/2 holds for the overlapping ratio of 50% yields:

$$G' = 1 + \frac{2\frac{L}{2}}{L}(G-1) = 1 + G - 1 = G \tag{69}$$

The fact that Q=L/4 holds for the overlapping ratio of 25% yields:

$$G' = 1 + \frac{2\frac{L}{4}}{L}(G-1) = 1 + \frac{1}{2}G - \frac{1}{2} = \frac{1}{2} + \frac{1}{2}G \tag{70}$$

The amplitude controller 708 corrects a correction coefficient transmitted from a phase controller 202 based on equation (68), and corrects an enhanced signal amplitude spectrum. In this embodiment, the components and operations except for the frame overlapping controller 2208 are the same as those in the fourth embodiment, and a description thereof will be omitted.

In addition to the effects of the fourth embodiment, the noise suppression apparatus 2200 according to this embodiment can freely set the frame overlapping ratio.

(12th Embodiment)

A noise suppression apparatus 2300 according to the 12th embodiment of the present invention will be described with reference to FIG. 23. FIG. 23 is a block diagram showing the overall arrangement of the noise suppression apparatus 2300. The noise suppression apparatus 2300 according to this embodiment includes an amplitude analyzer 205 and an amplitude suppression unit 2306. The remaining components and their operations are the same as those in the second embodiment and a detailed description thereof will be omitted.

In this embodiment, amplitude analysis is performed for a result of performing amplitude suppression, thereby deciding a frequency at which phase control is to be performed. Since a result of enhancing the amplitude of a target signal by performing amplitude suppression is analyzed, more accurate analysis can be performed, thereby preventing degradation in quality of a target signal component.

In this embodiment, since the output of an amplitude suppression unit 2306 is input to the amplitude analyzer 205, it is possible to perform amplitude analysis using amplitude information after suppression. For example, as a result of suppression, a frequency component suppressed close to the amplitude of background noise (environmental noise) is perceivable but the amplitude itself is small. However, due to amplitude suppression, if the phase before suppression is directly used, a combination of the amplitude and the phase is very unnatural. To deal with this, an amplitude slightly smaller than the background noise level is set as the first threshold.

By setting an amplitude slightly smaller than the background noise level as the first threshold, and setting an amplitude larger than the first threshold as a frequency at which phase control is to be performed, it is possible to reliably perform phase control at a frequency at which an enhanced signal becomes more unnatural when no phase control is performed, thereby improving the quality of a target signal component. Furthermore, by adaptively estimating background noise by the above-described method, it is possible to improve the quality of a target signal component in any environment.

(13th Embodiment)

A noise suppression apparatus 2400 according to the 13th embodiment of the present invention will be described with reference to FIG. 24. FIG. 24 is a block diagram showing the overall arrangement of the noise suppression apparatus 2400. In the noise suppression apparatus 2400 according to this embodiment, an amplitude analyzer 2405 performs amplitude analysis for amplitudes before and after an amplitude suppression unit 2306 performs amplitude suppression, thereby deciding a frequency at which phase control is to be performed. The remaining components and their operations are the same as those in the third embodiment and a detailed description thereof will be omitted.

According to this embodiment, since it is possible to decide a frequency at which phase control is to be performed in accordance with the degree of amplitude suppression, it is possible to improve the quality of a target signal component.

The amplitude analyzer 2405 is supplied with a deterioration signal amplitude spectrum from a transformer 201 and an enhanced signal amplitude spectrum from the amplitude suppression unit 2306. The amplitude analyzer 2405 performs amplitude analysis for amplitudes before and after amplitude suppression is performed, thereby deciding a frequency at which phase control is to be performed. For example, if the difference (or ratio) between the amplitudes before and after amplitude suppression is large, directly using the phase of a deteriorated signal as the phase of an enhanced signal gives more unnatural feeling. When the amplitude difference or amplitude ratio exceeds the predetermined fourth threshold, the frequency at that time is set as a phase control target. It is thus possible to reliably perform phase control at a frequency at which an enhanced signal becomes more unnatural when no phase control is performed, thereby improving the quality of a target signal component.

In addition, when the amplitude difference or amplitude ratio exceeds the predetermined fourth threshold, and the amplitude after suppression is close to the estimated amplitude of estimated background noise, the amplitude analyzer 2405 may set the frequency at that time as a phase control target. It is possible to reliably perform phase control at a frequency corresponding to an amplitude near the background noise level which has a large influence on the subjective quality of an enhanced signal, thereby improving the quality of a non-target signal component.

(Other Embodiments)

Although the aforementioned first to 13th embodiments have described the noise suppression apparatuses having different features, a noise suppression apparatus having a combination of these features is also incorporated in the scope of the present invention.

The present invention can be applied to a system including plural devices or a single apparatus. The present invention can be applied to a case in which a software signal processing program for implementing the functions of the embodiments is supplied to the system or apparatus directly or from a remote site. Therefore, the program installed in a computer to implement the functions of the present invention by the computer, a medium storing the program, or a WWW server to download the program is also incorporated in the scope of the present invention.

FIG. 25 is a block diagram showing the arrangement of a computer 2500 which executes a signal processing program when the first embodiment is implemented by the signal processing program. The computer 2500 includes an input unit 2501, a CPU 2502, an output unit 2503, and a memory 2504.

The CPU 2502 controls the operation of the computer 2500 by loading the signal processing program. That is, the CPU 2502 executes the signal processing program stored in the memory 2504, and transforms a mixed signal, in which the first and second signals coexist, into a phase component for each frequency and an amplitude component or power component for each frequency (step S2511). Then, the CPU 2502 analyzes the amplitude component or power component, and derives a predetermined frequency at which the component matches a predetermined condition (step S2512). The CPU 2502 generates a change amount of a phase component at the predetermined frequency by using a series of data with a cross-correlation weaker than that of the phase components (step S2513). The CPU 2502 controls the phase component at the predetermined frequency in accordance with the generated change amount (step S2514). The CPU 2502 generates an enhanced signal by using the phase component having undergone the control processing in step S2514 (step S2515).

Accordingly, the same effects as those of the first embodiment can be obtained. Note that the same applies to the second to 13th embodiments. The system implemented when the CPU executes the signal processing program for implementing the functions of the embodiments is also incorporated in the scope of the present invention. This application claims the benefit of Japanese Patent Application No. 2012-259219 filed on Nov. 27, 2012, which is hereby incorporated by reference herein in its entirety.

What is claimed is:

1. A signal processing apparatus characterized by comprising:
    a transforming circuit that transforms a mixed signal, in which a first signal and a second signal coexist, into a phase component for each frequency and one of an amplitude component and a power component for each frequency;
    an amplitude analyzing circuit that derives a predetermined frequency at which said one of the amplitude component and the power component matches a predetermined condition;
    a change amount generating circuit that generates a change amount of the phase component at the predetermined frequency, the change amount to reduce a phase correlation between the first signal and the second signal at the predetermined frequency;
    a phase controlling circuit that controls the phase component at the predetermined frequency by using the change amount provided from said change amount generator; and
    an inverse transforming circuit that generates an enhanced signal by using the phase component having undergone control processing by said phase controller.

2. The signal processing apparatus according to claim 1, characterized in that said amplitude analyzing circuit decides, as the predetermined frequency at which phase control is to be performed, a frequency having an amplitude larger than an absolute audibility threshold.

3. The signal processing apparatus according to claim 1 or 2, characterized in that said amplitude analyzing circuit decides, as the predetermined frequency at which phase control is to be performed, a frequency having an amplitude larger than a masking level.

4. The signal processing apparatus according to claim 1 or 2, characterized in that said amplitude analyzing circuit decides, as the frequency at which phase control is to be performed, a frequency having an amplitude larger than a first threshold and smaller than a second threshold.

5. The signal processing apparatus according to, claim 1 or 2, characterized in that said amplitude analyzing circuit decides, as a frequency at which phase control is not to be performed, a frequency detected as a peak of a spectrum contained in the amplitude component.

6. The signal processing apparatus according to claim 1 or 2, characterized in that when the amplitude component in a high frequency range is larger than a predetermined value, said amplitude analyzing circuit decides the high frequency range as a frequency at which phase control is not to be performed.

7. The signal processing apparatus according to claim 1 or 2, characterized in that based on a background noise level, said amplitude analyzing circuit decides a frequency at which phase control is not to be performed.

8. A computer-implemented method for enhancing a signal component in an input signal comprising executing on a processor the steps of:
   transforming a mixed signal, in which a first signal and a second signal coexist, into a phase component for each frequency and one of an amplitude component and a power component for each frequency;
   deriving a predetermined frequency at which said one of the amplitude component and the power component matches a predetermined condition;
   generating a change amount of the phase component at the predetermined frequency, the change amount to reduce a phase correlation between the first signal and the second signal at the predetermined frequency;
   controlling the phase component at the predetermined frequency by using the change amount provided in the generating the change amount; and
   generating an enhanced signal by using the phase component having undergone control processing in the controlling.

9. A non-transitory computer-readable medium storing a signal processing program for causing a computer to execute a method, characterized by comprising:
   transforming a mixed signal, in which a first signal and a second signal coexist, into a phase component for each frequency and one of an amplitude component and a power component for each frequency;
   deriving a predetermined frequency at which said one of the amplitude component and the power component matches a predetermined condition;
   generating a change amount of the phase component at the predetermined frequency, the change amount to reduce a phase correlation between the first signal and the second signal at the predetermined frequency;
   controlling the phase component at the predetermined frequency by using the change amount provided in the generating the change amount; and
   generating an enhanced signal by using the phase component having undergone control processing in the controlling.

* * * * *